(12) United States Patent
Gogo et al.

(10) Patent No.: US 7,052,027 B2
(45) Date of Patent: May 30, 2006

(54) STEERING DAMPER APPARATUS, AND MOTORCYCLE INCLUDING SAME

(75) Inventors: Kazuhiko Gogo, Saitama (JP); Akimi Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/921,082

(22) Filed: Aug. 18, 2004

(65) Prior Publication Data

US 2005/0046141 A1    Mar. 3, 2005

(30) Foreign Application Priority Data

Aug. 26, 2003  (JP) ............................. 2003-301072
Mar. 23, 2004  (JP) ............................. 2004-085399

(51) Int. Cl.
*B62K 21/08*    (2006.01)

(52) U.S. Cl. ....................................... 280/272; 180/219

(58) Field of Classification Search ................ 280/271, 280/272, 279, 280, 89, 90; 180/219
See application file for complete search history.

(56) References Cited

U.S. PATENT DOCUMENTS 615,961 A * 12/1898 Doyle ........................ 280/272
2,087,535 A * 7/1937 Dall ............................ 280/272
4,558,878 A * 12/1985 Motrenec ...................... 280/272
5,383,676 A * 1/1995 Valentino ..................... 280/271
2005/0046141 A1 * 3/2005 Gogo et al. .................. 280/271
2005/0151341 A1 * 7/2005 Iwamoto et al. ............. 280/272
2005/0212250 A1 * 9/2005 Gogo et al. .................. 280/272

FOREIGN PATENT DOCUMENTS

JP            64-4633         2/1989

* cited by examiner

*Primary Examiner*—Lesley D. Morris
*Assistant Examiner*—Matthew Luby
(74) *Attorney, Agent, or Firm*—Carrier, Blackman & Associates, P.C.; William D. Blackman; Joseph P. Carrier

(57) ABSTRACT

A cylindrical steering damper apparatus for a motorcycle has a relatively simple structure, in which a gradually increasing damping force is generated according to the turned angle when a handlebar is turned, and the damping force is not generated when the handlebar is returned. The cylindrical damper is disposed between a head pipe, for pivotally supporting a steering stem, and a fork bridge of a front fork, so as to be the shortest when the handlebarbar is at a neutral position. The cylindrical damper is connected to the head pipe and the fork bridge via spherical ball-and-socket joints. The cylindrical damper generates the damping force when being expanded. Since the cylindrical damper is expanded when the handlebar is turned in either a left or right direction, a damping force is generated.

16 Claims, 18 Drawing Sheets

STEERING DAMPER APPARATUS, AND MOTORCYCLE INCLUDING SAME

CROSS-REFERENCE TO RELATED APPLICATIONS

The present invention claims priority under 35 USC 119 based on Japanese patent application No. 2003-301072, filed Aug. 26, 2003, and also based on Japanese patent application No. 2004-085399, filed Mar. 23, 2004.

BACKGROUND OF THE INVENTION

1. Field of the Invention

The present invention relates to a steering damper apparatus for use on a small vehicle such as a motorcycle, and to a vehicle incorporating the novel steering damper.

2. Background Art

In a motorcycle, steering is performed by operating a handlebarbar to pivotally turn a steering stem, pivotally inserted into a head pipe at the front end of a vehicle body frame, where the steering stem is connected to a front fork, which supports a front wheel. Such a motorcycle may be provided with a steering damper apparatus located between the steering-side member, which rotates when the handlebar is operated, and the vehicle-body-side member which does not rotate, when the handlebar is operated.

In such a steering damper arrangement, the steering damper apparatus is only required to generate a small damping moment during normal travel, in which the turned angle of the handlebar is small and the angular speed is low. Conversely, the steering damper apparatus is required to generate a high damping moment where the turned angle of the handlebar is large and the angular speed is high. It would be advantageous to restrain a burden of the handlebar operation as much as possible by setting the damping moment in the low-speed range to a small value in a situation in which the speed is low and small turns occur continuously.

Therefore, in the steering damper art, there is a known steering damper apparatus for a motorcycle in which the above-described requirements are satisfied by using a swing-type damper, and providing a bypass for varying a damping force in a complex manner.

However, the steering damper apparatus employing such a swing-type damper is complex in structure and expensive, and in addition, bulky and heavy. Therefore, it may constrain the arrangement of other parts.

There is also another known steering damper apparatus for a motorcycle which is configured by a cylindrical damper which has a simple structure and is inexpensive, which has been well known for a number of years (For example, see Japanese Published Patent Document JP-UM-B-64-4633). The steering damper apparatus disclosed by this reference includes a cylindrical damper having a damper case and a damper rod sliding in the damper case, in which the damper case is pivotally connected to a head pipe on the vehicle body side, and to a first fork bridge on the steering side. Also in the steering damper in the reference, the damper rod is pivotally connected to another one of the fork bridges on the steering side. In such a case, a connecting point on the fork bridge side is a position closer to either one of left and right ends of the fork bridge.

According to the steering damper apparatus as described above, since the cylindrical damper is contracted when the handlebar is turned to the right, and expanded when turned to the left, a damping effect may be generated on either sides. Accordingly, the damping force can be generated at the limits of rotation.

Generally, the cylindrical damper design generates a uniform damping force in a contracting stroke or an expansion stroke of the damper. Therefore, the apparatus configured such that the cylindrical damper is contracted on one side and expanded on the other side depending on the turning direction of the handlebar, as stated in JP-UM-B-64-4633 may have the same characteristics when the handlebar is turned in either directions of right or left from the steered angle of zero degrees, but it is difficult to configure the apparatus so as to generate different values of the damping force when the handlebar is turned from the steered angle of zero degrees when the handlebar is turned to the steered angle of zero degrees. It is also difficult to provide an angle-dependent characteristic to the steered angle of the handlebar. Furthermore, in the apparatus stated in JP-UM-B-64-4633, a long damper stroke is structurally required, and hence a compact layout cannot be achieved.

SUMMARY OF THE INVENTION

In view of such circumstances as described above, it is an object of the present invention to provide a steering damper apparatus which can provide a desired characteristic while using a normal cylindrical damper of a simple structure.

In order to achieve the above-described object, the invention according to a first aspect provides a steering damper apparatus including a cylindrical damper having a damper case and a damper rod slidably disposed in the damper case, the cylindrical damper disposed between a steering-side member, which rotates about a steering stem when a handlebar is operated, and a vehicle-body-side member, which does not rotate when the handlebar is operated, characterized in that the cylindrical damper is mounted in such a manner that the damper rod takes a longest position or a shortest position when the steered angle of the handlebar is in the vicinity of zero degrees.

In the steering damper apparatus according to the first aspect, the invention according to a second aspect hereof is further characterized in that the cylindrical damper is provided in front of a head pipe, which pivotally supports the steering stem, substantially along the length of the head pipe so that the damper rod takes the shortest position when the steered angle of the handlebar is in the vicinity of zero degrees.

In addition to the steering damper apparatus according to the first aspect, the invention according to a third aspect is further characterized in that the cylindrical damper is provided in the fore-and-aft direction between a fork bridge positioned forwardly of the steering stem and a vehicle body frame positioned rearwardly of the steering stem so that the damper rod takes the longest position when the steered angle of the handlebar is in the vicinity of zero degrees.

The invention according to a fourth aspect hereof is a steering damper apparatus including a cylindrical damper having a damper case and a damper rod slidably disposed in the damper case, the cylindrical damper disposed between a steering-side member, which rotates about a steering stem when a handlebar is operated, and a vehicle-body-side member, which does not rotate when the handlebar is operated, characterized in that the cylindrical damper is disposed so that a center axis of the cylindrical damper is positioned substantially on a plane including a center axis of the steering stem when the steered angle of the handlebar is in the vicinity of zero degrees.

In addition to the steering damper apparatus according to the fourth aspect, the invention according to a fifth aspect is further characterized in that the cylindrical damper is disposed so that the center axis of the cylindrical damper lies substantially along a center plane of the vehicle body extending in the fore-and-aft direction of the vehicle body when the steered angle of the handlebar is in the vicinity of zero degrees.

The present invention according to a sixth aspect hereof provides a cylindrical steering damper having a damper rod sliding in a damper case. The cylindrical damper is disposed between a steering side member, which rotates about a steering stem when the handlebar is operated, and a vehicle-body-side member, which does not rotate when the handlebar is operated, and is characterized in that the cylindrical damper is mounted so that the damper rod slides in the damper case in the same direction in either cases where the cylindrical damper is steered leftward or rightward from the position at which the steered angle of the handlebar is zero degrees.

In addition to the steering damper apparatus according to the sixth aspect, the present invention according to a seventh aspect is further characterized in that the cylindrical damper is provided in front of a head pipe, which pivotally supports the steering stem, substantially along the length of the head pipe so that the damper rod takes the shortest position when the steered angle of the handlebar is in the vicinity of zero degrees.

In addition to the steering damper apparatus according to the sixth aspect, the present invention according to an eighth aspect is further characterized in that the cylindrical damper is provided in the fore-and-aft direction between the fork bridge positioned forwardly of the steering stem and the vehicle body frame positioned rearwardly of the steering stem so that the damper rod takes the longest position when the steered angle of the handlebar is in the vicinity of zero degrees.

Furthermore, in addition to the steering damper apparatus according to the sixth aspect, the present invention according to a ninth aspect is further characterized in that the amount of sliding movement of the damper rod with respect to the steered angle of the handlebar is small when the steered angle of the handlebar is in the vicinity of zero degrees, and increases as the steered angle of the handlebar goes away from zero degrees.

In addition to the steering damper apparatus according to the sixth aspect, the invention according to a tenth aspect is characterized in that a damping force acting on the steering-side member from the cylindrical damper is small when the steered angle of the handlebar is in the vicinity of zero degrees, and increases as the steered angle of the handlebar goes away from zero degrees.

The invention according to an eleventh aspect hereof is a steering damper apparatus including a cylindrical damper having a damper case and a damper rod slidably disposed in the damper case, the cylindrical damper disposed between a steering-side member, which rotates about a steering stem when a handlebar is operated, and a vehicle-body-side member, which does not rotate when the handlebar is operated, characterized in that the cylindrical damper is connected to the steering-side member via a link lever pivotally supported by the vehicle-body-side member and a link rod connected to the link lever, in that, the link rod is disposed so that a straight line connecting the joint portions at both ends of the link rod is positioned substantially on a plane including a center axis of the steering stem when the steered angle of the handlebar is in the vicinity of zero degrees.

In addition to the steering damper apparatus according to the eleventh aspect, the invention according to a twelfth aspect hereof is characterized in that the link rod is disposed so that the straight line connecting the joint portions at the both ends of the link rod lies substantially along the center plane of the vehicle body extending in the fore-and-aft direction of the vehicle body when the steered angle of the handlebar is in the vicinity of zero degrees.

According to the first aspect of the present invention, since the cylindrical damper either contracts or expands when the handlebar is turned in either directions of right or left from the steered angle of zero degrees, the symmetrical characteristic may be provided. Although it will be reverse when bringing the handlebar back, since the cylindrical damper can be set so that different damping force characteristics are effected between the contract stroke and the expansion stroke, it can be adapted so as to generates a damping moment when turning the handlebar and to reduce the damping moment when returning the handlebar. Therefore, the requirements described above which is required for the steering damper apparatus of a motorcycle or the like can be satisfied.

According to the second aspect of the present invention, since the cylindrical damper is provided substantially along the length of the head pipe, impairment of design of the vehicle by the steering damper apparatus can be alleviated.

According to the third aspect of the present invention, since the cylindrical damper is provided in the fore-and-aft direction, the steering damper apparatus is disposed so as to lie substantially along the vehicle body frame, and hence restraint putted on the layout of other parts by the steering damper apparatus may be reduced.

According to the fourth aspect of the present invention, by disposing the cylindrical damper in such a manner that the center axis of the cylindrical damper is positioned on a plane including the center axis of the steering stem, the cylindrical damper expands and contracts symmetrically when the handlebar is turned to the right and to the left from the steered angle of zero degrees, so that the symmetrical characteristic is provided to the steering damper apparatus.

In addition, according to the fifth aspect of the present invention, since the cylindrical damper is provided substantially along the center plane in the fore-and-aft direction of the vehicle body, the steering damper apparatus is prevented from protruding significantly from the vehicle body toward the left and the right, and hence the entire steering damper apparatus can be disposed compactly.

According to the sixth aspect of the present invention, in either cases where the handlebar is turned rightward or leftward from the steered angle of zero degrees, the cylindrical damper is either contracted or expanded, and hence the same effect as the effect of the present invention according to the first aspect described above can be achieved.

According to the seventh aspect of the present invention, the same effect as the effect of the invention according to the second aspect is achieved.

According to the eighth aspect of the present invention, the same effect as the effect of the invention according to the third aspect is achieved.

In addition, according to the ninth aspect of the present invention, since the amount of sliding movement of the damper rod with respect to the steered angle of the handlebar increases as the steered angle of the handlebar goes away from zero degrees, a high damping moment can be generated in the range in which the turned angle of the handlebar is large and an angular speed is high, and hence the above-described requirement which is required for the steering damper apparatus for a motorcycle or the like can be satisfied.

In addition, according to the tenth aspect of the present invention, since a damping force acting on the steering-side member from the cylindrical damper is small when the steered angle of the handlebar is in the vicinity of zero degrees, and increases as the steered angle of the handlebar goes away from zero degrees, the apparatus can be adapted in such a manner that the damping force is hardly generated in the range in which the turned angle of the handlebar is small and a large damping force is generated in the range in which the turned angle of the handlebar is large. Therefore, the above-described requirements required for the steering damper apparatus for a motorcycle or the like can be satisfied.

According to the eleventh aspect of the present invention, by the cylindrical damper connected to the steering-side member via the link mechanism, since the movement of the steering-side member can be transmitted to the cylindrical damper when the cylindrical damper is disposed at a distance, flexibility of the layout of the cylindrical damper can be further increased.

According to the twelfth aspect of the present invention, since the elongated link rod, which constitutes the link mechanism, is provided substantially along the center plane extending in the fore-and-aft direction of the vehicle body, the steering damper apparatus can be prevented from protruding significantly to the left and the right from the vehicle body although the link mechanism is employed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF SELECTED ILLUSTRATIVE EMBODIMENTS

Selected illustrative embodiments of the present invention will be described below, with the description supplemented by the attached drawings. It should be understood that only structures considered necessary for clarifying the present invention are described herein. Other conventional structures, and those of ancillary and auxiliary components of the system, are assumed to be known and understood by those skilled in the art.

First Embodiment

Figure 1:
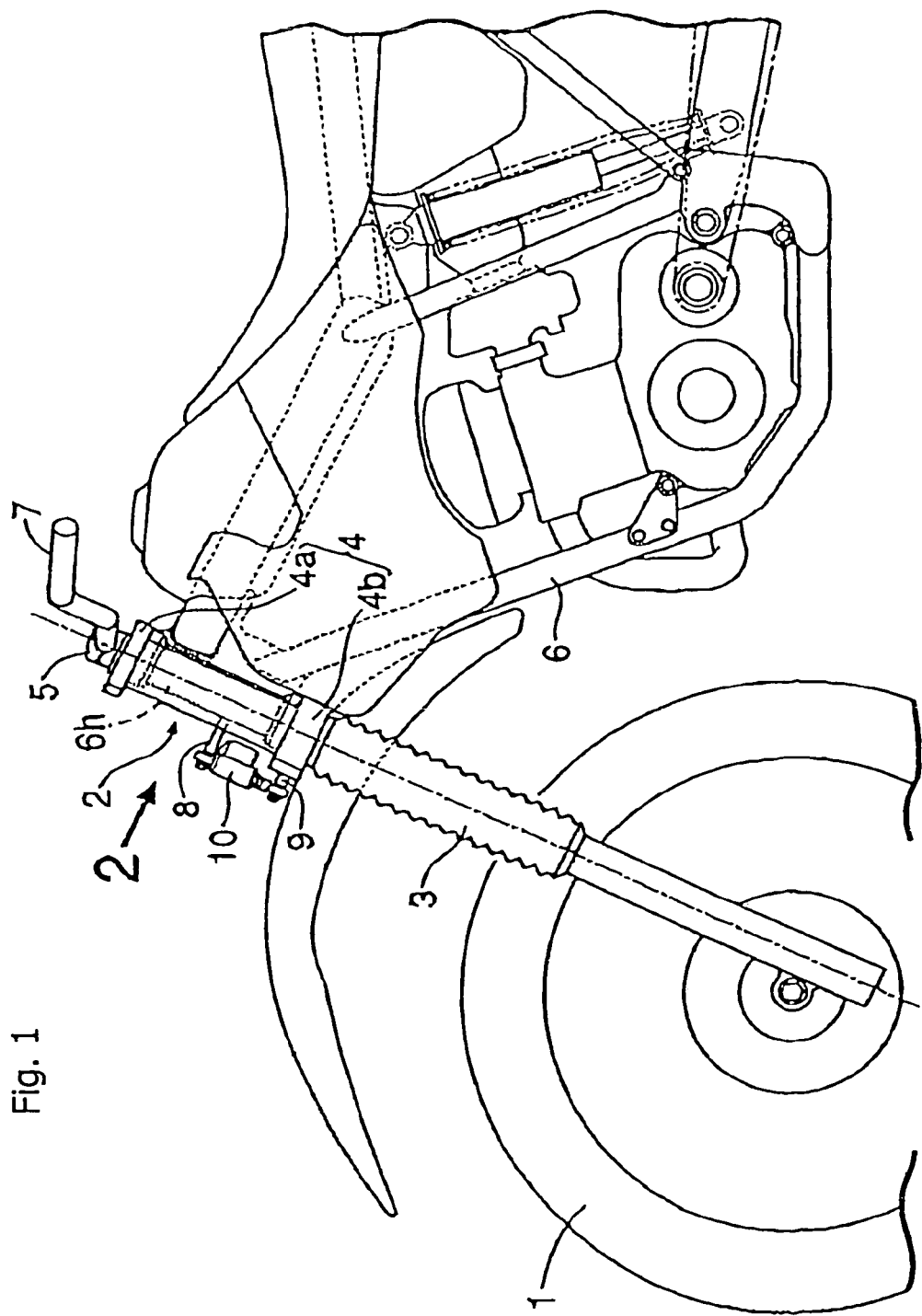
FIG. 1 is a side view showing a principal portion of a motorcycle provided with the steering damper apparatus according to a first embodiment of the present invention.
Figure 2:
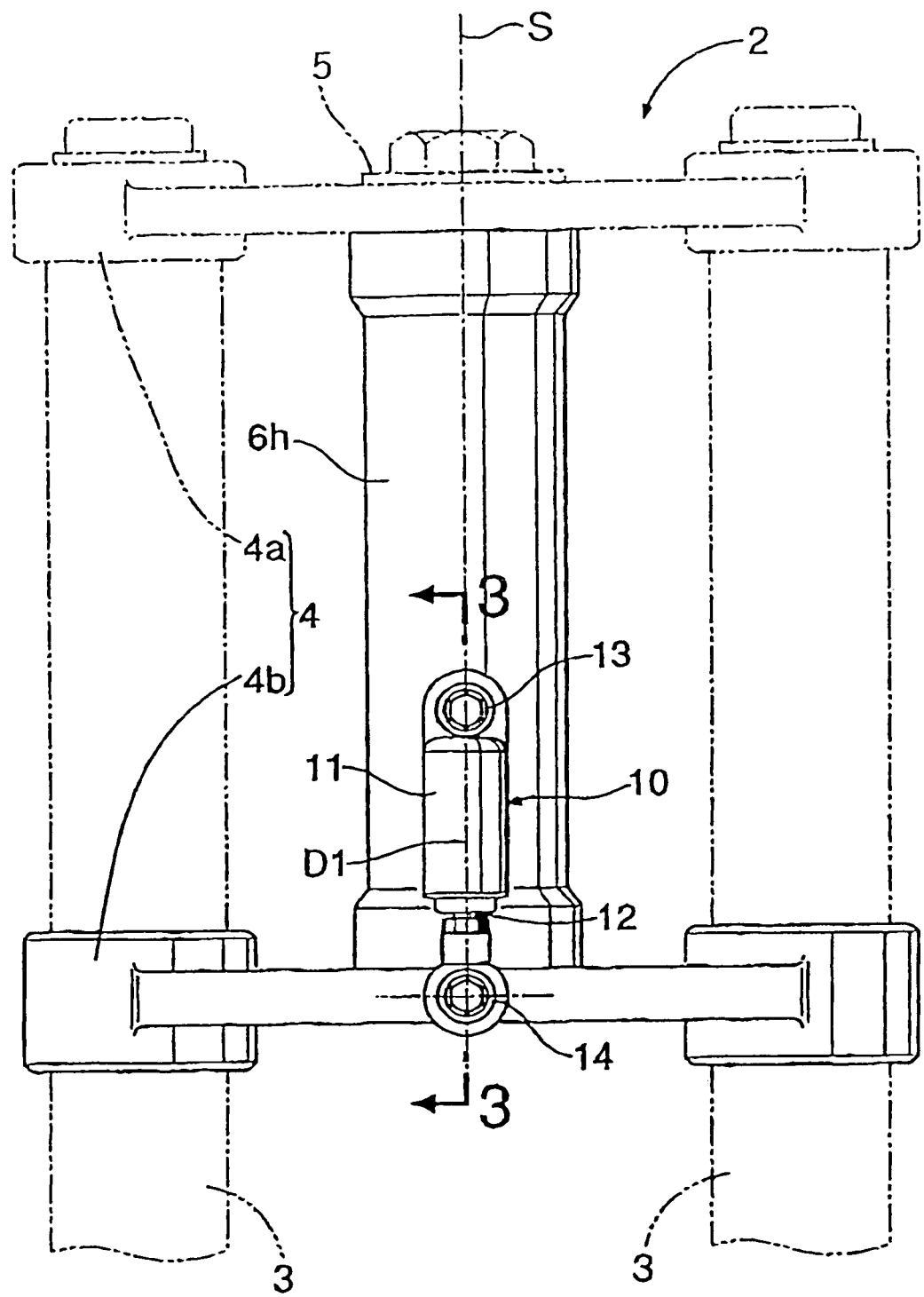
FIG. 2 is a front view of a front fork portion viewed in the direction indicated by an arrow 2 in FIG. 1.
Figure 3:
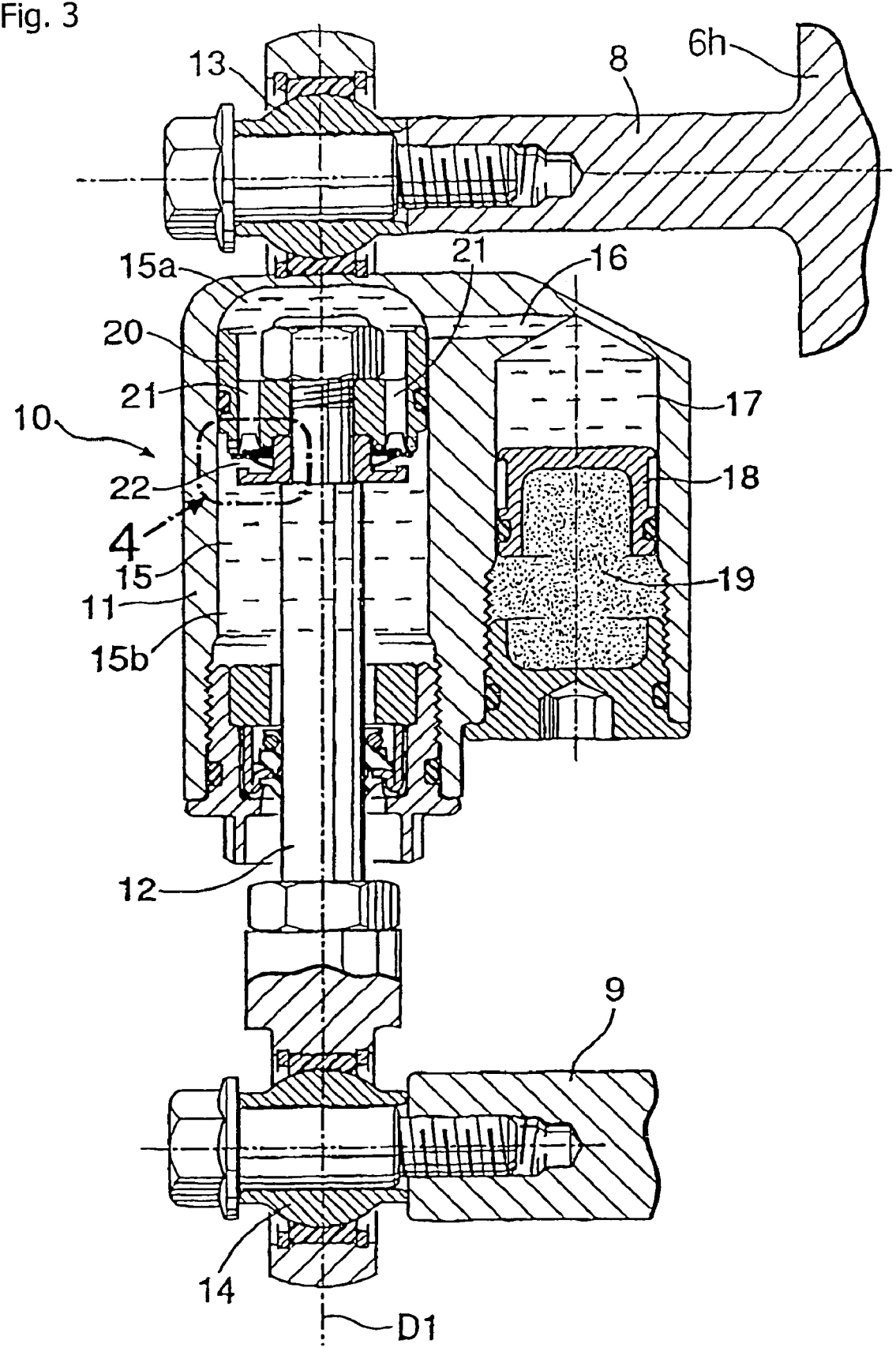
FIG. 3 is a cross-sectional view of a cylindrical damper portion taken along the line 3—3 in FIG. 2.
Figure 4:
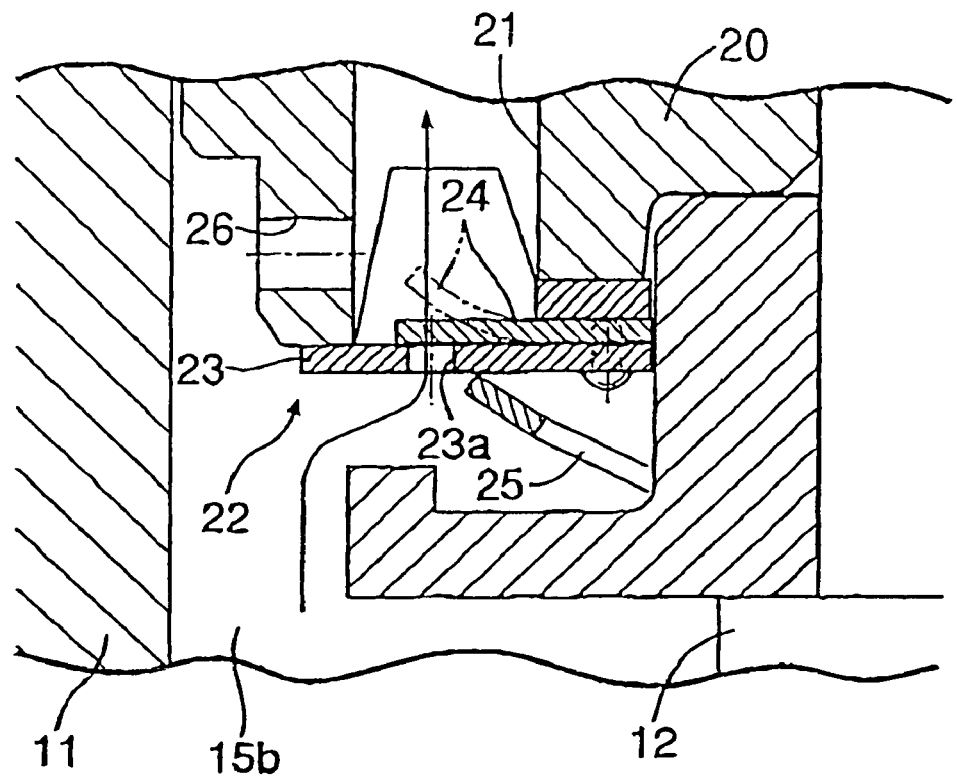
FIG. 4 is an explanatory enlarged view of the cylindrical damper showing a portion indicated by an arrow 4 in FIG. 3.
Figure 5:
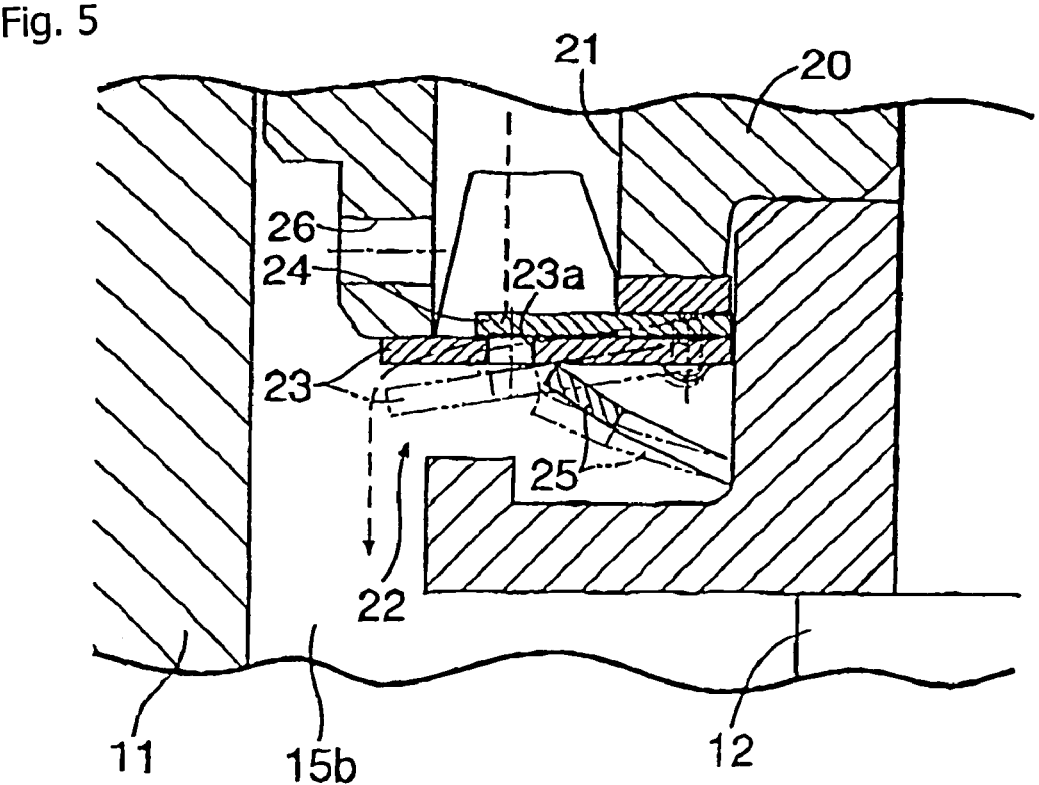
FIG. 5 is an explanatory enlarged view of the cylindrical damper similar to FIG. 4.
Figure 6:
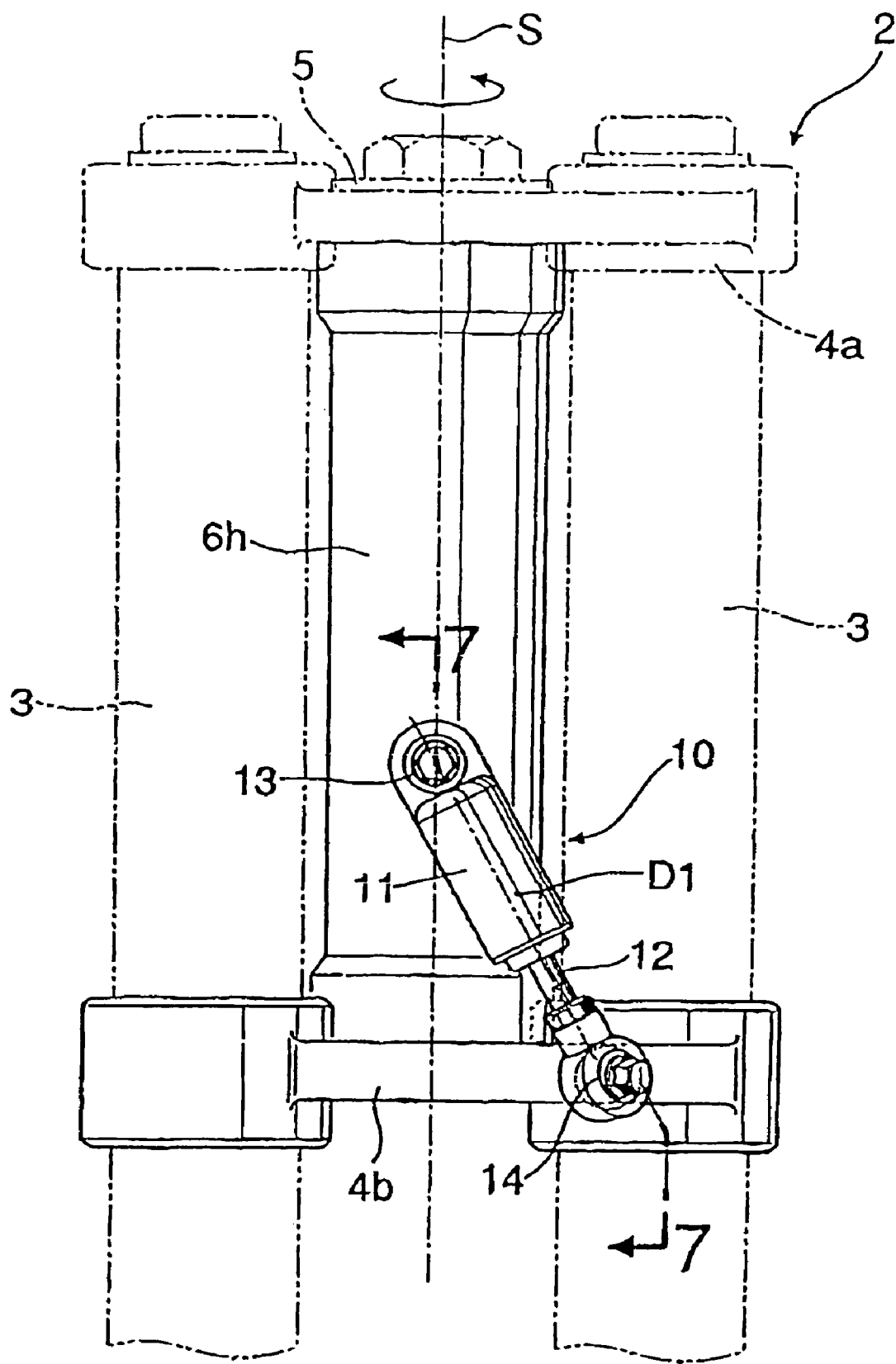
FIG. 6 is a front view, which is similar to FIG. 2, showing a state in which a handlebar is turned to the left.
Figure 7:
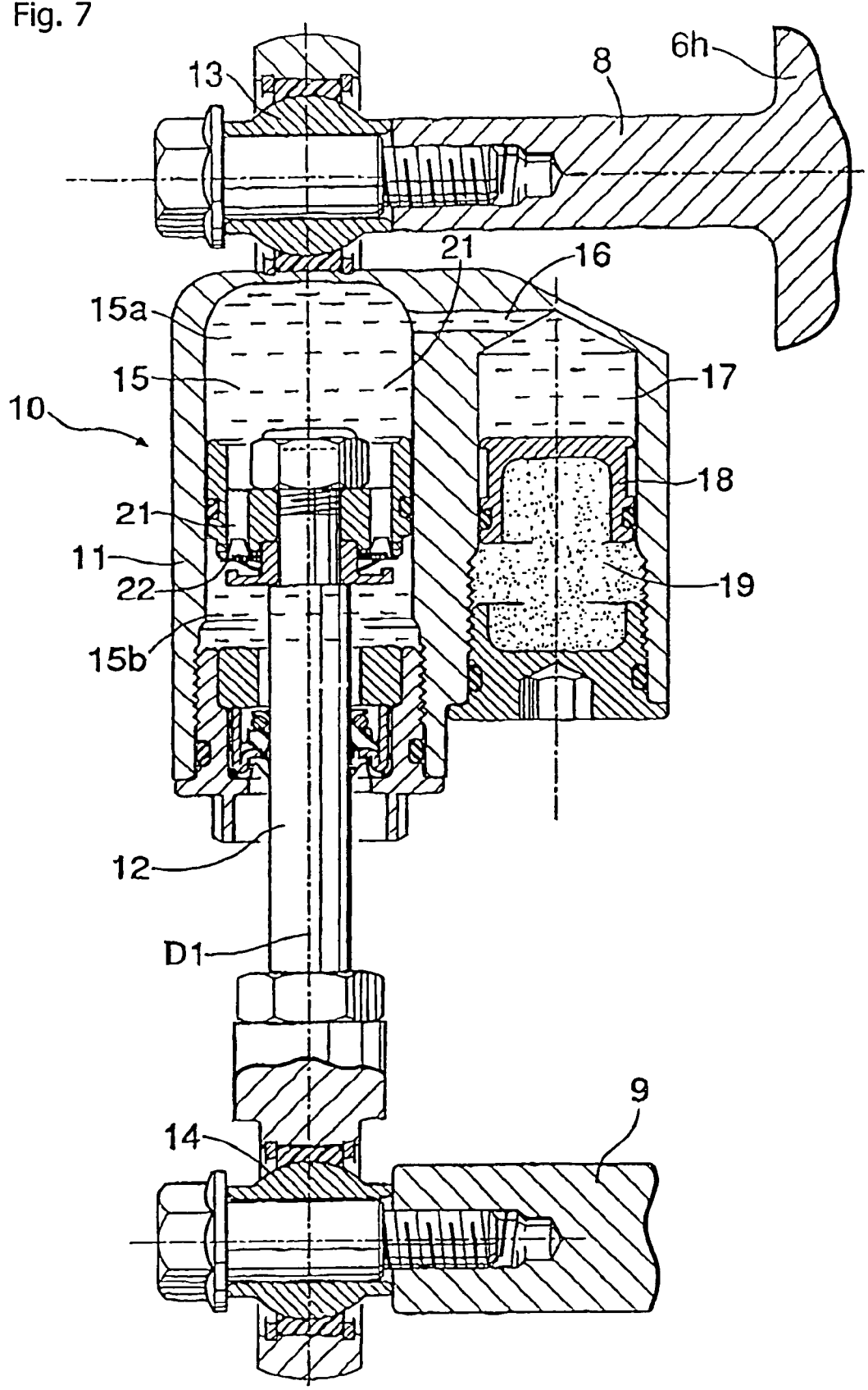
FIG. 7 is a cross-sectional view taken along the line 7—7 in FIG. 6.
Figure 8:
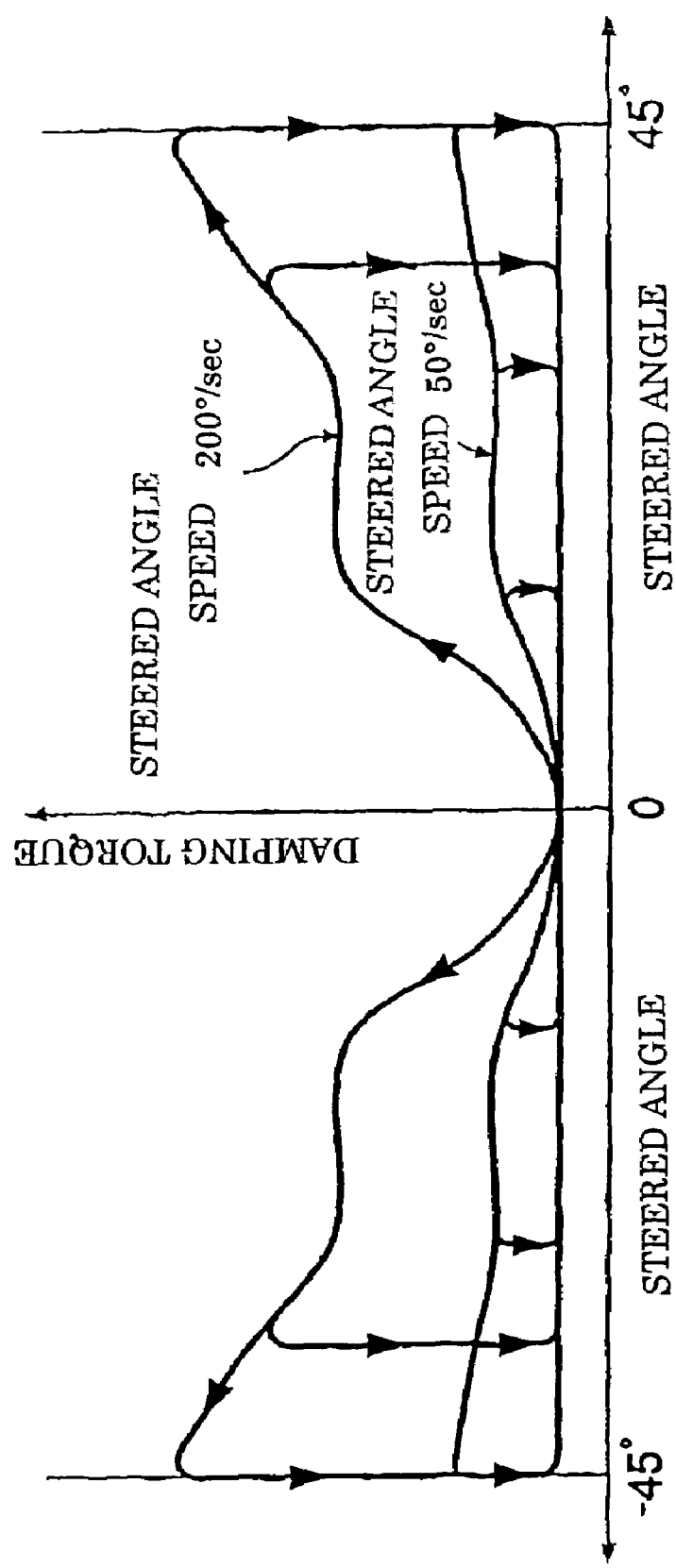
FIG. 8 is a characteristic curve of the steering damper apparatus.

FIGS. 1 to 8 of the drawings illustrate a steering damper apparatus according to a first embodiment of the present invention. FIG. 1 is a side view showing a principal portion of a motorcycle provided with the steering damper apparatus according to the first embodiment. FIG. 2 is a front view of a front fork portion of the motorcycle of FIG. 1, viewed in the direction indicated by an arrow 2 in FIG. 1. FIG. 3 is a cross-sectional view of a cylindrical damper portion taken along the line 3—3 in FIG. 2. FIGS. 4 and 5 are explanatory enlarged views of the cylindrical damper according to the first embodiment hereof. FIG. 6 is a front view, which is similar to FIG. 2, showing a state in which a handlebar is turned to the left. FIG. 7 is a cross-sectional view taken along the line 7—7 in FIG. 6; and FIG. 8 is a characteristic performance curve of the steering damper apparatus.

As shown in FIGS. 1 and 2, a front fork 2 supporting a front wheel 1 of a motorcycle includes left and right fork pipes 3, 3, and a fork bridge 4 for connecting the upper ends thereof. The fork bridge 4 includes a top bridge 4a and a bottom bridge 4b disposed in parallel and at a distance in the vertical direction, and a steering stem 5 is arranged between the lateral centers of the respective bridges 4a, 4b so as to rigidly connect them together. The steering stem 5 is pivotally inserted into a head pipe 6h provided at the front end of a vehicle body frame 6. A handlebarbar 7 is attached to the top bridge 4a to allow for steering of the motorcycle. In this manner, the front fork 2 rotates leftward or rightward within a limited range of travel about the steering stem 5 when the handlebar 7 is operated, and the front wheel 1 supported by the front fork rotates therewith, so that steering of the motorcycle is achieved.

The head pipe 6h is provided with a forwardly projecting stay 8 at the lower end thereof. The stay 8 is disposed on the centerline in the fore-and-aft direction of the vehicle body. The bottom bridge 4b is also provided with a forwardly projecting stay 9 at the lateral center thereof. A cylindrical steering damper 10 is disposed between the stays 8, 9. In other words, the cylindrical damper 10 is disposed in front of the head pipe 6h so as to lie substantially along the length of the head pipe 6h.

As shown in FIG. 3, the cylindrical damper 10 includes a damper case 11, and a damper rod 12 slidably disposed in the damper case 11. The damper case 11 is pivotally connected to the head pipe 6h side, that is, to the stay 8 on the vehicle body side, via a spherical joint 13, and the damper rod 12 is pivotally connected to the bottom bridge 4b side, that is, to the stay 9 on the steering side via a spherical joint 14. It is also adapted in such a manner that the center axis of the damper rod 12 which slides in the damper case 11, that is, the center axis D1 of the cylindrical damper 10 passes through the centers of the spherical joints 13, 14. In this manner, the cylindrical damper 10 is attached between the vehicle body frame 6, which does not rotate during operation of the handlebar 7, and the front fork 2 which rotates with the handlebar 7.

As shown in FIG. 2, the cylindrical damper 10 takes the most contracted state, that is, the damper rod 12 takes the shortest position when the handlebar 7 is at a neutral position, that is, when a steered angle of the handlebar is zero degrees. In addition, the center axis D1 of the cylindrical damper 10 is adapted to lie in parallel with the center axis S of the steering stem 5 and of the head pipe 6h. Therefore, at this time, the center axis D1 of the cylindrical damper 10 is positioned on a plane including the center axis S of the steering stem 5 and extending in the fore-and-aft direction of the vehicle body, that is, on the center plane of the vehicle body extending in the fore-and-aft direction of the vehicle body.

The damper case 11 of the cylindrical damper 10 includes, as shown in FIG. 3, a damper chamber 15, and a reservoir chamber 17 in communication with the damper chamber 15 via a oil channel 16. Oil is encapsulated in the damper chamber 15 and the reservoir chamber 17. The lower surface of the reservoir chamber 17 is defined by a piston 18, and the piston 18 is pressed and urged upward by compression gas 19 encapsulated in the gas chamber provided below. The damper chamber 15 is divided into two upper and lower chambers 15a, 15b by a piston 20 attached at the extremity of the damper rod 12.

The piston 20 is provided with a plurality of vertically penetrating openings 21, 21 . . . and a valve 22 for opening and closing the lower ends of the openings 21. As shown in FIG. 4 and FIG. 5, the valve 22 includes a valve plate 23 having a valve hole 23a which is relatively small in diameter, a rubber plate 24 for opening and closing the valve hole 23a, and a leaf spring 25 for urging the valve plate 23 toward the closed position of the openings 21. In addition, the piston 20 is provided with an orifice 26 for allowing the openings 21 and the lower chamber 15b of the damper chamber 15 to be constantly in communication with each other.

In the cylindrical damper 10 thus configured, when expanding, the pressure in the lower chamber 15b of the damper chamber 15 increases as the piston 20 mounted at the extremity of the damper rod 12 slides downward in the damper chamber 15. Therefore, as shown in FIG. 4 by an arrow, oil in the lower chamber 15b flows into the upper chamber 15a via the valve hole 23a, then via the openings 21. Then, a damping force is generated due to a resistance when oil passes through the valve hole 23a. When contracting, since the pressure in the upper chamber 15a of the damper chamber 15 increases, as shown in FIG. 5 by an imaginary line, the valve plate 23 is deformed downward against an urging force of the leaf spring 25. As a consequence, the openings 21 open, and oil in the upper chamber 15a flows through the openings 21 into the lower chamber 15b. Therefore, at this time, the damping force is hardly generated.

The operation of the steering damper apparatus thus configured will now be described. As described above, when the handlebar 7 is at the neutral position, that is, when the steered angle of the handlebar is zero degrees, the cylindrical damper 10 is contracted to the maximum and takes the shortest state. When the handlebar 7 is turned in this state, for example, to the left, the front fork 2 rotates leftward about the steering stem 5, which is pivotally inserted into the head pipe 6h of the vehicle body frame 6, as shown in FIG. 6.

Therefore, the bottom bridge 4b constituting the fork bridge 4 of the front fork 2 also rotates, and the spherical joint 14 connecting the stay 9 provided at the lateral center thereof and the damper rod 12 of the cylindrical damper 10 is deviated from the centerline in the fore-and-aft direction of the vehicle body. On the other hand, the spherical joint 13 connecting the stay 8, which is provided on the head pipe 6h, and the damper case 11 of the cylindrical damper 10, remains at its original position, that is, on the centerline in the fore-and-aft direction of the vehicle body since the head pipe 6h does not rotate when the handlebar 7 is rotated. As a consequence, the cylindrical damper 10 is expanded and the damper rod 12 slides in the damper case 11 downward in FIG. 3, and hence the damping force is generated.

Also, when the handlebar 7 is turned toward the right as well, the cylindrical damper 10 is expanded and the damper rod 12 slides in the damper case 11 downward in FIG. 3. Therefore, the damping force is generated. In this manner, the cylindrical damper 10 is provided such that the damper rod 12 slides in the damper case 11 in the same direction in either cases where the handlebar 7 is steered leftward or rightward from the position where the steered angle of the handlebar is zero degrees.

In addition, when the handlebar 7 is turned in either directions of left or right, as long as the turned angle of the handlebar 7, that is, as long as the steered angle is the same, the amount of expansion of the cylindrical damper 10 is the same. Therefore, the damping force characteristic is symmetry as shown in FIG. 8.

When returning the handlebar 7 which is turned rightward or leftward to its neutral position, the cylindrical damper 10 contracts and the damper rod 12 slides in the damper case 11 upward in FIG. 3 in either cases. As described above, the cylindrical damper 10 is adapted not to generate the damping force during contraction. Therefore, when returning the steered steering, the damping force is hardly generated. In this manner, the steering damper apparatus may be configured so that the damping force is generated in both cases where the handlebar 7 is turned rightward and where it is turned leftward from the steered angle zero degrees, and the damping force is reduced when returning the handlebar 7 to the steered angle of zero degrees.

FIG. 8 shows a calculated damping moment to be generated when the cylindrical damper 10 is mounted to a certain position and the handlebar 7 is steered leftward and rightward at a certain constant speed. The damping force of the damper 10 has a characteristic in which the damping force increases at a constant rate with respect to the expansion speed of the damper 10.

As shown in FIG. 8, according to the steering damper apparatus, a generated damping moment is small where the turned angle of the handlebar 7 is small, and a generated damping moment increases with increase in turned angle. In other words, the damping force acting on the front fork 2, which is the steering-side member, from the cylindrical damper 10 is small when the steered angle of the handlebar is in the vicinity of zero degrees, and increases as the steered angle of the handlebar goes away from zero degrees. In addition, during that time, generation of the damping moment continues smoothly.

As described above, the reason why the damping moment is hardly generated in the initial stage when the handlebar 7 is steered from the neutral position is that the amount of expansion of the cylindrical damper 10 is small in the vicinity of the neutral position of the handlebar 7. Then, in the middle stage, since the damper stroke increases gradually with respect to the turned angle of the handlebar 7, the damping force increases gradually as well. In other words, in this steering damper apparatus, the amount of sliding movement of the damper rod 12 with respect to the steered angle of the handlebar is small when the steered angle of the handlebar is in the vicinity of zero degrees, and increases as the steered angle of the handlebar goes away from zero degrees. In the late stage, since the moment arm about the steering axis is significantly reduced, increase in damping moment becomes sluggish.

In such a manner, with this steering damper apparatus, the above-described requirements required for the steering damper apparatus for a motorcycle may be satisfied.

Since the relatively short cylindrical damper 10 must simply be attached to the head pipe 6h at the front thereof, it can be configured to be compact and light-weight, and the possibility of impairment of the design or the like is also eliminated. Furthermore, since the productivity of the cylindrical damper 10 is high, the cost reduction is also achieved.

Second Embodiment

Figure 9:
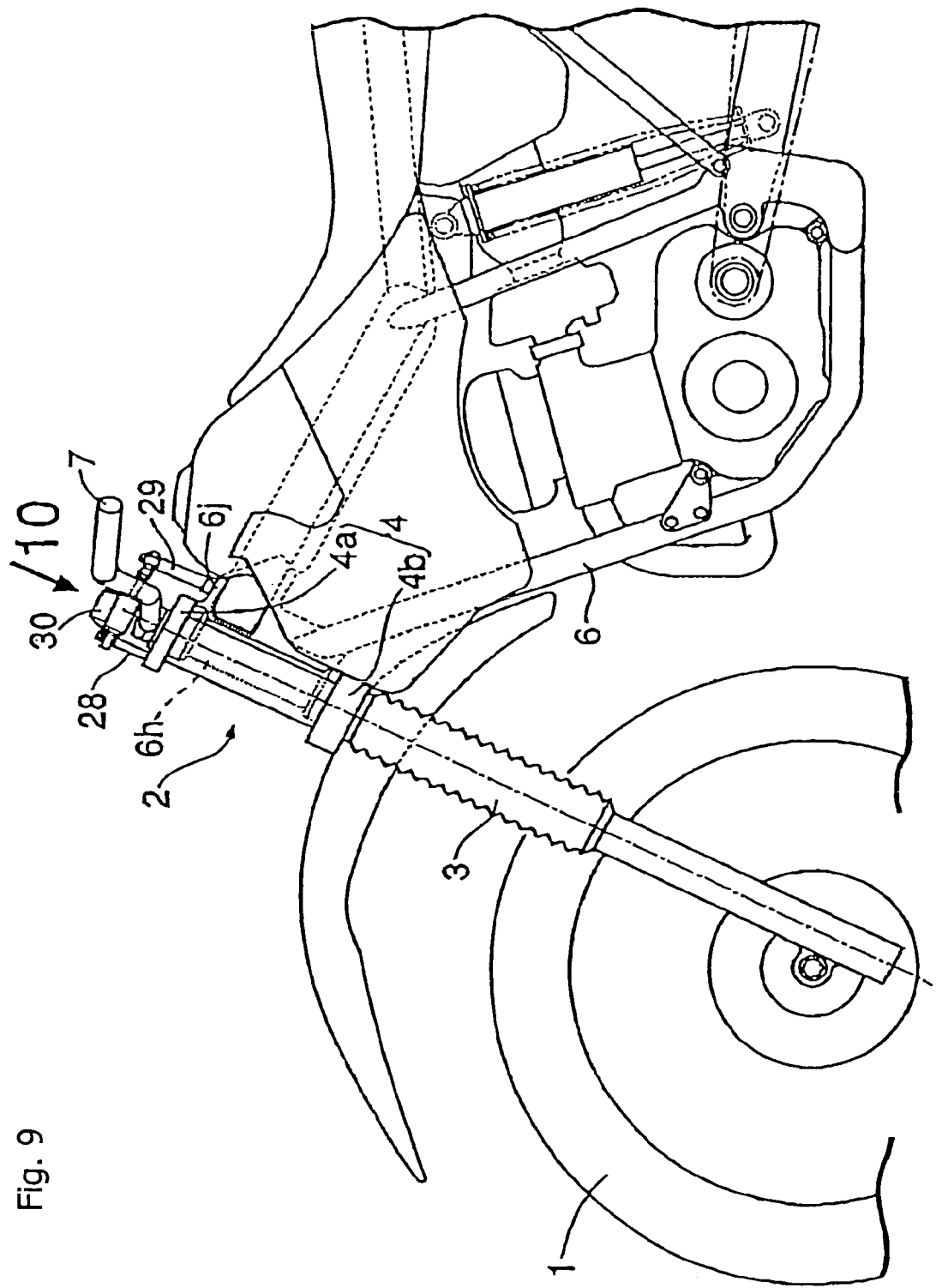
FIG. 9 is a side view showing a principal portion of a motorcycle provided with the steering damper apparatus of a second embodiment of the present invention.
Figure 10:
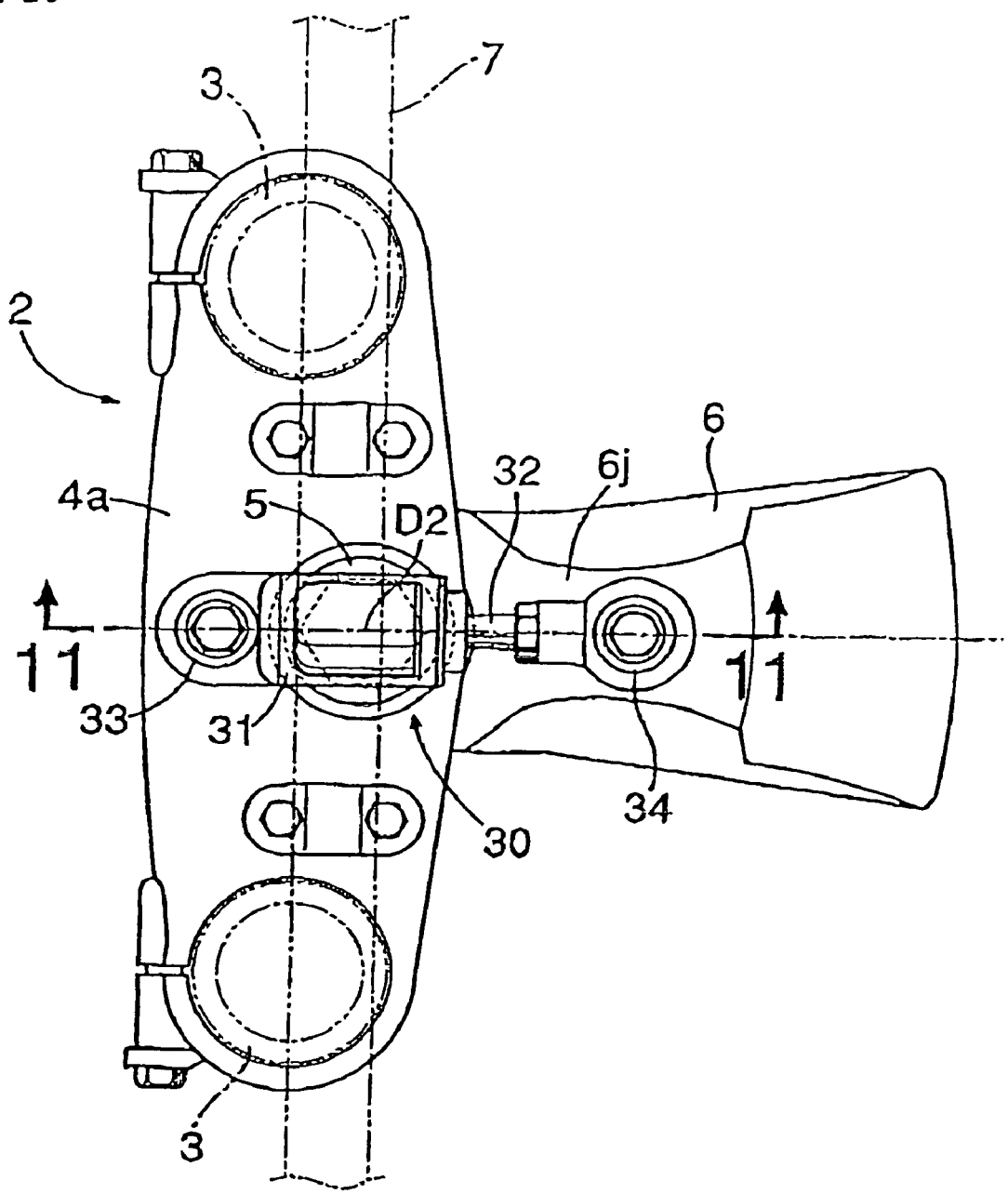
FIG. 10 is a plan view of a front fork portion viewed in the direction indicated by an arrow 10 in FIG. 9.
Figure 11:
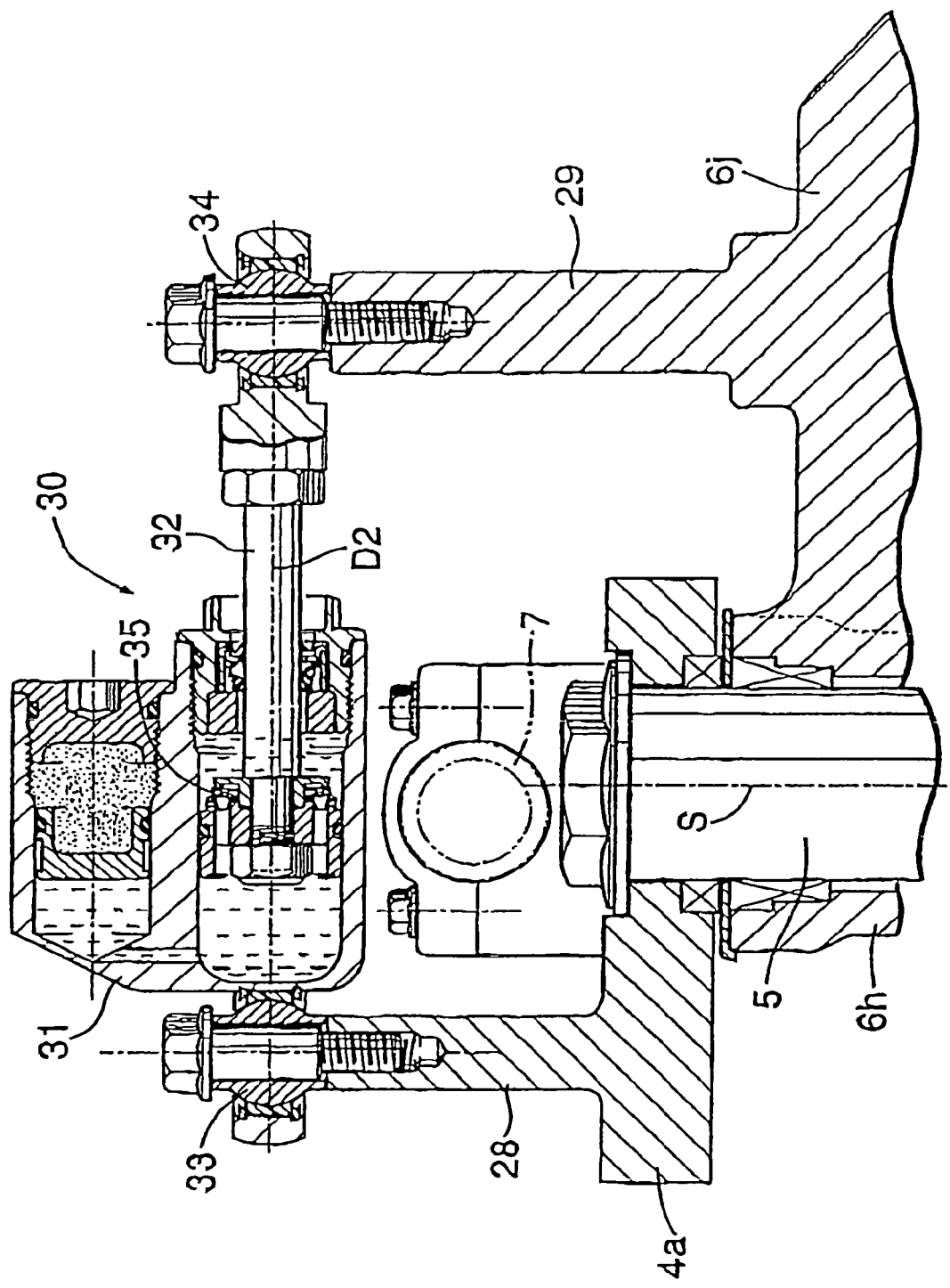
FIG. 11 is a cross-sectional view taken along the line 11—11 in FIG. 10.
Figure 12:
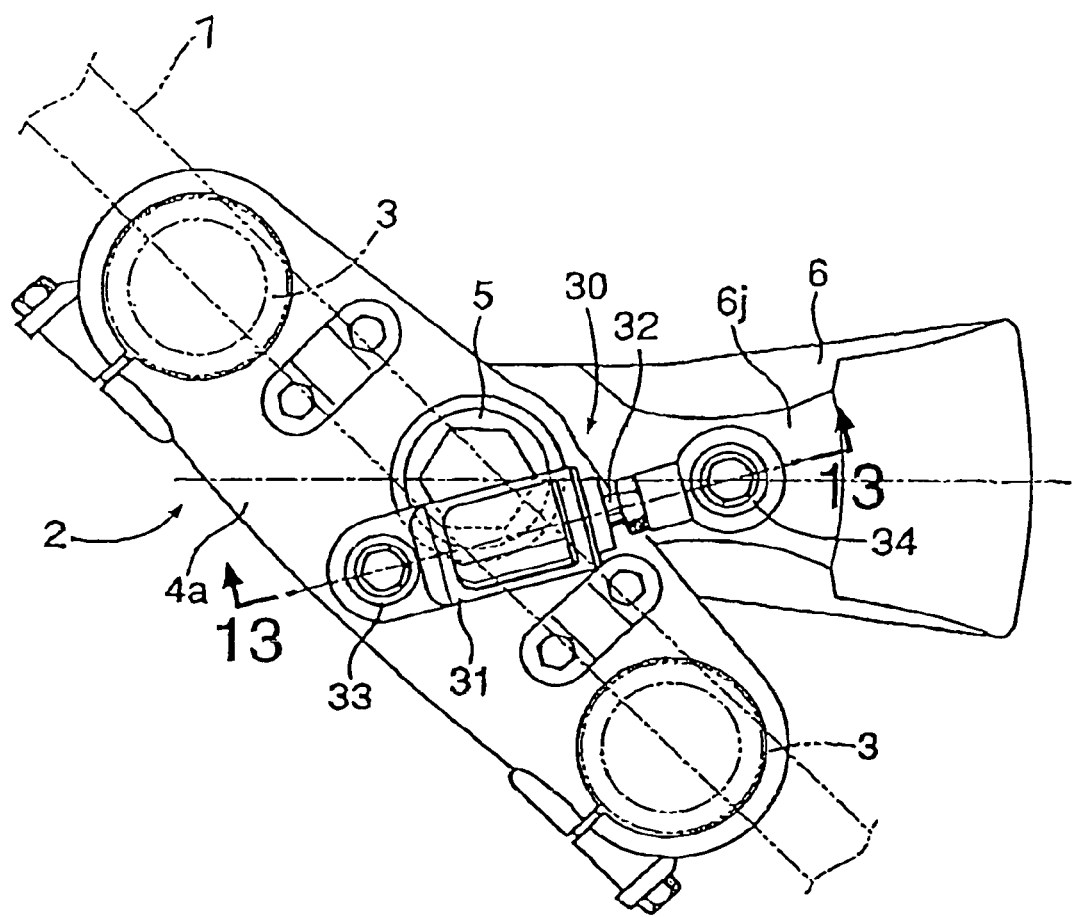
FIG. 12 is a plan view similar to FIG. 10, showing a state in which the handlebar is turned leftward.
Figure 13:
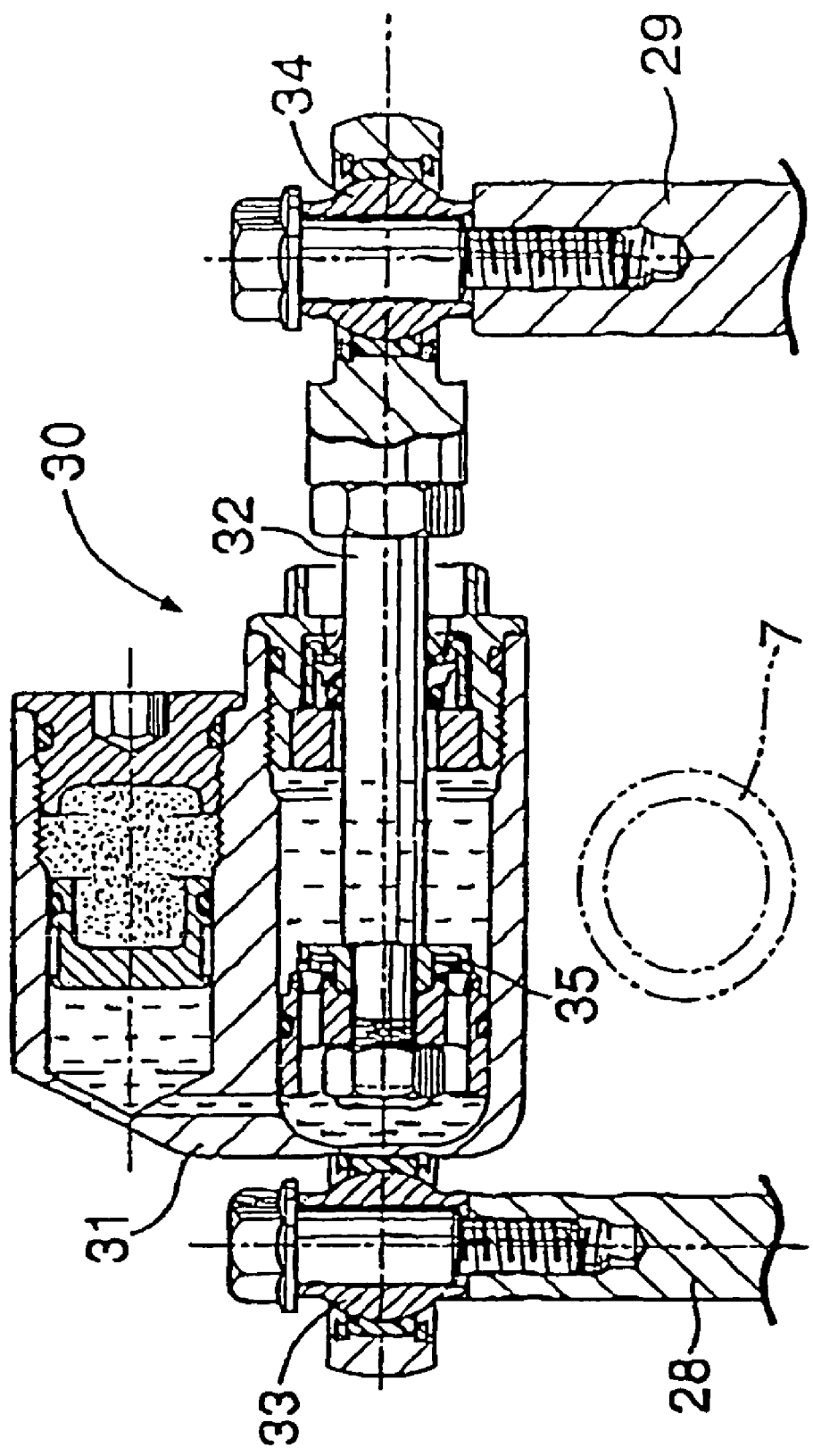
FIG. 13 is a cross-sectional view taken along the line 13—13 in FIG. 12.

FIG. 9 to FIG. 13 shows a second embodiment of the steering damper apparatus according to the present invention. FIG. 9 is a side view showing a principal portion of the motorcycle provided with the steering damper apparatus; FIG. 10 is a plan view of a front fork portion viewed in the direction indicated by an arrow 10 in FIG. 9; FIG. 11 is a cross-sectional view of the cylindrical damper taken along the line 11—11 in FIG. 10; FIG. 12 is a plan view similar to FIG. 10, showing a state in which the handlebar is turned leftward; and FIG. 13 is a cross-sectional view taken along the line 13—13 in FIG. 12.

In the second embodiment, the parts corresponding to the first embodiment are represented by the same reference numerals and duplicated description is omitted.

As shown in FIG. 9 and FIG. 10, in the case of the second embodiment, an upwardly projecting stay 28 is provided at the center of the upper surface of the top bridge 4a, which corresponds to the upper portion of the fork bridge 4, at the position forwardly of the steering stem 5. Provided on the head pipe 6h of the vehicle body frame 6 is an extending portion 6j extending rearward from the upper end thereof, and an upwardly projecting stay 29 is provided on the upper surface of the extending portion 6j. A cylindrical damper 30 is disposed between the stays 28, 29.

As shown in FIG. 11, the cylindrical damper 30 includes a damper case 31 and a damper rod 32 sliding in the damper case 31. The damper case 31 is pivotally connected to the stay 28 on the top bridge 4a side, which corresponds to the steering-side member, via a spherical joint 33, and the damper rod 32 is pivotally connected to the stay 29 on the head pipe 6h side which corresponds to the vehicle-body-side member via a spherical joint 34. In addition, the center axis of the damper rod 32, that is, the center axis D2 of the cylindrical damper 30 passes the centers of the spherical joints 33, 34.

In this manner, the cylindrical damper 30 is attached between the vehicle body frame 6 which does not rotate during operation of the handlebar 7, and the front fork 2 which rotates with the operation of the handlebar 7. As shown in FIG. 10, the cylindrical damper 10 takes the most expanded state, that is, the damper rod 32 takes the longest position when the handlebar 7 is at a neutral position, that is, when the steered angle of the handlebar is zero degrees. In addition, it is adapted so as to be positioned on the center plane in the fore-and-aft direction of the vehicle body across the steering stem 5 and the head pipe 6h. Therefore, at that time, the center axis D2 of the cylindrical damper 30 is positioned on the plane including the center axis S of the steering stem 5 and extending in the fore-and-aft direction, that is, on the center plane of the vehicle body extending in the fore-and-aft of the vehicle body.

Since the structure of the cylindrical damper 30 is almost the same as the cylindrical damper 10 in the first embodiment except that a valve 35 generates a damping force when the cylindrical damper 30 is contracted, and the damping force is hardly generated when the cylindrical damper 30 is expanded, the detailed description is omitted. The construction of other parts is also the same as the first embodiment.

In the steering damper apparatus configured as described above, when the handlebar 7 is at the neutral position, the cylindrical damper 30 is in the most expanded longest state as described above. When the handlebar 7 is turned leftward from this state, as shown in FIG. 12, the front fork 2 rotates leftward about the steering stem 5 pivotally inserted into the head pipe 6h of the vehicle body frame 6.

Therefore, the top bridge 4a which constitutes the fork bridge 4 of the front fork 2 also rotates, and the spherical joint 33 connecting the stay 28 provided at the lateral center thereof and the damper case 31 of the cylindrical damper 30 is deviated from the center plane of the vehicle body in the fore-and-aft direction of the vehicle body. On the other hand, the spherical joint 34 connecting the stay 29 provided on the extending portion 6j of the head pipe 6h and the damper rod 32 of the cylindrical damper 30 remains at its original position, that is, on the center plane of the vehicle body in the fore-and-aft direction of the vehicle body since the head pipe 6h does not rotate when the handlebar 7 is operated.

As a consequence, the cylindrical damper 30 is contracted, and the damper rod 32 slides in the damper case 31 leftward in FIG. 11, and hence the damping force is generated. Also, when the handlebar 7 is turned rightward, the cylindrical damper 30 is also contracted and the damper rod 32 slides in the damper case 31 leftward in FIG. 11. Therefore, the damping force is generated. In this manner, the cylindrical damper 30 is provided such that the damper rod 32 slides in the damper case 31 in the same direction in either cases where the handlebar 7 is steered leftward and rightward from the position where the steered angle of the handlebar is zero degrees.

In addition, when the handlebar 7 is turned in either directions of right or left, the amount of expansion of the cylindrical damper 30 is the same as long as the turned angle of the handlebar 7, that is, the steered angle is the same. Therefore, the damping force characteristic is symmetry.

When returning the handlebar 7 which is turned rightward or leftward to the neutral position, the cylindrical damper 30 is expanded and the damper rod 32 slides in the damper case 31 rightward in FIG. 11 in either cases. As described above, the cylindrical damper 30 is adapted to hardly generate the damping force when being expanded.

Therefore, when returning the steered steering back to the original position, the damping force is hardly generated. In this manner, with the steering damper apparatus according to the second embodiment, it can be adapted in such a manner that the damping force is generated when the handlebar 7 is turned, and the damping force is decreased when the handlebar 7 is returned.

In addition, in this steering damper apparatus as well, the amount of sliding movement of the damper rod 32 with respect to the steered angle of the handlebar is small when the steered angle of the handlebar is in the vicinity of zero degrees and increases as the steered angle of the angle goes away from zero degrees.

Also, the damping force acting from the cylindrical damper 30 on the front fork 2 which is the steering-side member is small when the steered angle of the handlebar is in the vicinity of zero degrees, and increases as the steered angle of the handlebar goes away from zero degrees. Therefore, the above-described requirements required for the steering damper apparatus of the motorcycle can be satisfied by this steering damper apparatus.

Since the cylindrical damper 30 is provided in the fore-and-aft direction, the steering damper apparatus is arranged so as to lie substantially along the vehicle body frame 6, and hence restraint putted on the layout of other parts by the steering damper apparatus may be reduced.

Third Embodiment

Figure 14:
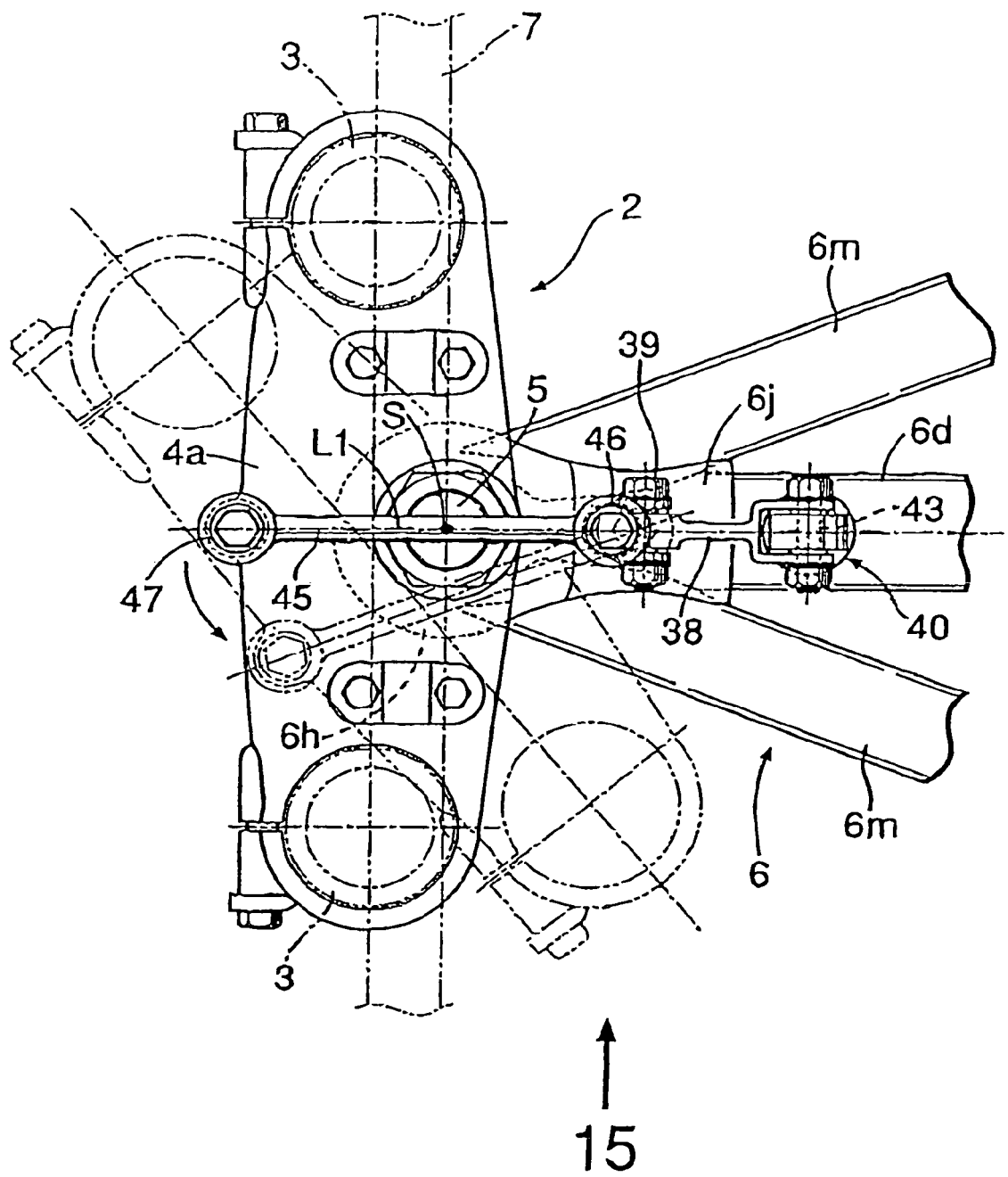
FIG. 14 is a plan view of the front fork portion of the motorcycle provided with the steering damper apparatus according to a third embodiment of the present invention.
Figure 15:
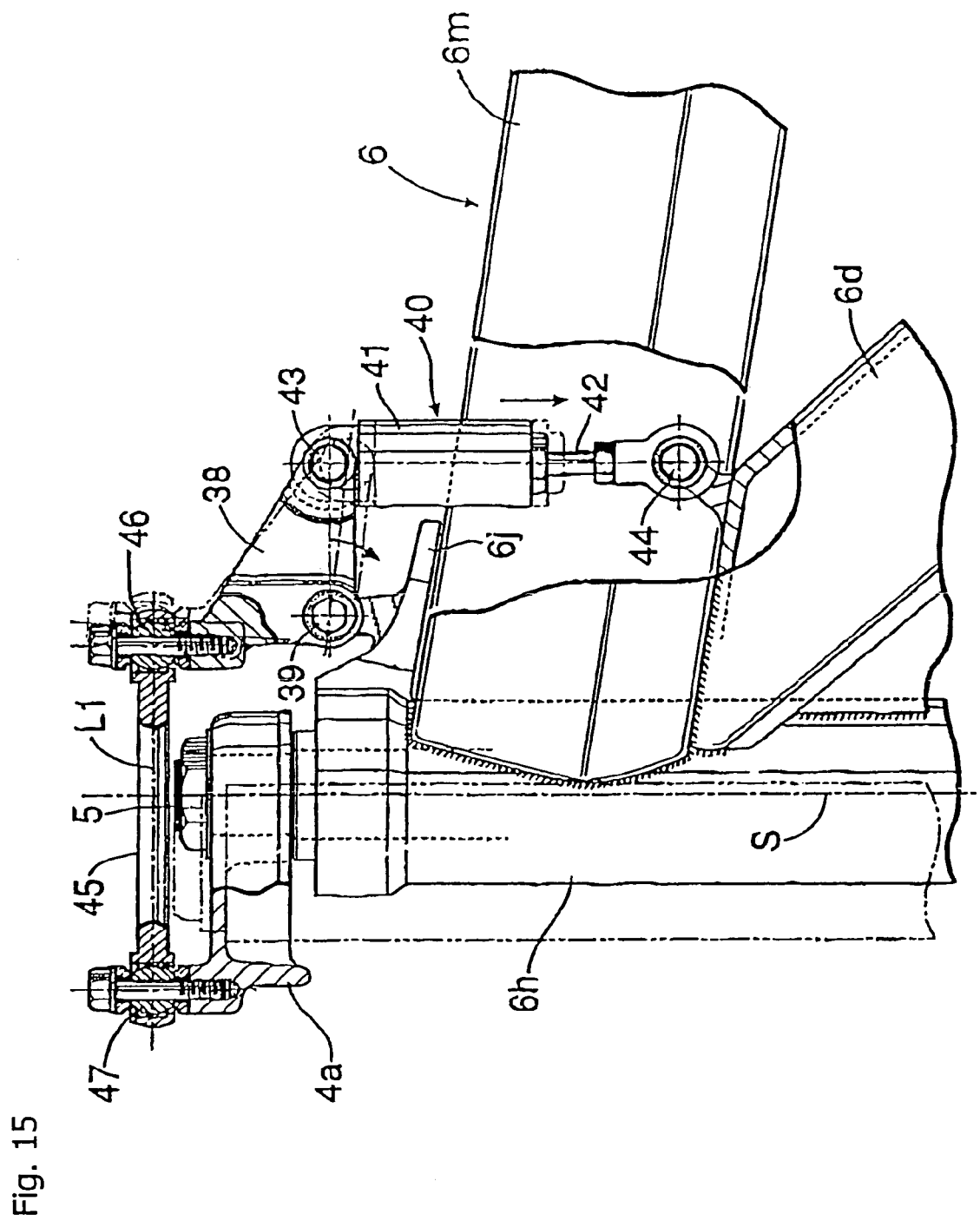
FIG. 15 is a side view viewed in the direction indicated by an arrow 15 in FIG. 14.

FIG. 14 and FIG. 15 show a third embodiment of the steering damper apparatus according to the present invention. FIG. 14 is a plan view of the front fork portion of the motorcycle provided with the steering damper apparatus, and FIG. 15 is a side view viewed in the direction indicated by an arrow 15 in FIG. 14.

In the third embodiment, the parts corresponding to the second embodiment are represented by the same reference numerals and duplicated description is omitted.

As shown in FIG. 14 and FIG. 15, in the third embodiment, the top of the head pipe 6h is pivotally supported via a horizontal shaft 39. Then, a cylindrical damper 40 is provided between a link lever 38 and a down tube 6d between left and right main frames 6m, 6m which constitute the vehicle body frame 6 together with the head pipe 6h.

The cylindrical damper 40 includes a damper case 41 and a damper rod 42 which slides in the damper case 41. The damper case 41 is pivotally connected to the rear end of the link lever 38 via a horizontal shaft 43, and the damper rod 42 is pivotally connected to the upper end surface of the down tube 6d via a horizontal shaft 44.

On the other hand, a link rod 45 is pivotally connected to the upper surface of the front end of the link lever 38 via the spherical joint 46, and the other end of the link rod 45 is pivotally connected to the center of the upper surface of the top bridge 4a, which corresponds to the upper portion of the fork bridge 4, at the position forwardly of the steering stem 5 via a spherical joint 47.

In this manner, the cylindrical damper 40 is connected to the fork bridge 4, which corresponds to the steering-side member rotating about the steering stem 5 when the handlebar is operated, and is connected to the vehicle body frame 6 which does not rotate when the handlebar is operated via the link lever 38 and the link rod 45. The link rod 45 is disposed in such a manner that a straight line L1 connecting the centers of the spherical joints 46, 47, which are joint portions at both ends of the link rod 45, is positioned on the center plane of the vehicle body including the center axis S of the steering stem 5 and extending in the fore-and-aft direction of the vehicle body when the handlebar 7 is at the neutral position, that is, when the steered angle of the handlebar is zero degrees.

The cylindrical damper 40 is adapted to generate a damping force when being contracted, and to generate little damping force when being expanded. The construction of other parts is also the same as the second embodiment.

In the steering damper apparatus thus configured, when the handlebar 7 is turned leftward for example, the front fork 2 rotates leftward about the center axis S of the steering stem 5 and the top bridge 4a is tuned to the position indicated by an alternate long and two short dashed line in FIG. 14. Therefore, the spherical joint 47 connected to the center of the front portion of the top bridge 4a moves as indicated by an arrow in FIG. 14.

Consequently, the spherical joint 46 connected to the link lever 38 is pressed rearward by the link rod 45 connected to the spherical joint 47, and hence the link lever 38 rotates about the horizontal shaft 39 as shown in an arrow in FIG. 15. Therefore, the cylindrical damper 40 is contracted, and the damping force is applied on the top bridge 4a, which corresponds to the steering-side member, from the cylindrical damper 40. Also, when the handlebar 7 is turned rightward as well, since the spherical joint 46 on the link-lever 38 side is pressed rearward, the cylindrical damper 40 is also contracted in the same manner and the damping force is generated.

When the handlebar 7 which is turned rightward or leftward is returned to the neutral position, the cylindrical damper 40 is expanded in either cases, and hence the attenuation force can hardly be generated.

In this manner, the steering damper apparatus according to the third embodiment can also be configured to generate a damping force when being steered and to generate little damping force when the steered steering is returned. In the case of this steering damper apparatus, the movement of the steering-side member is transmitted to the cylindrical damper 40 via the link rod 45 and the link lever 38, and hence the cylindrical damper 40 can be disposed away from the steering-side member and, in addition, in the given direction, so that the cylindrical damper 40 can be arranged utilizing a dead space between the main frames 6m, 6m as in the above-described embodiment.

Fourth Embodiment

Figure 16:
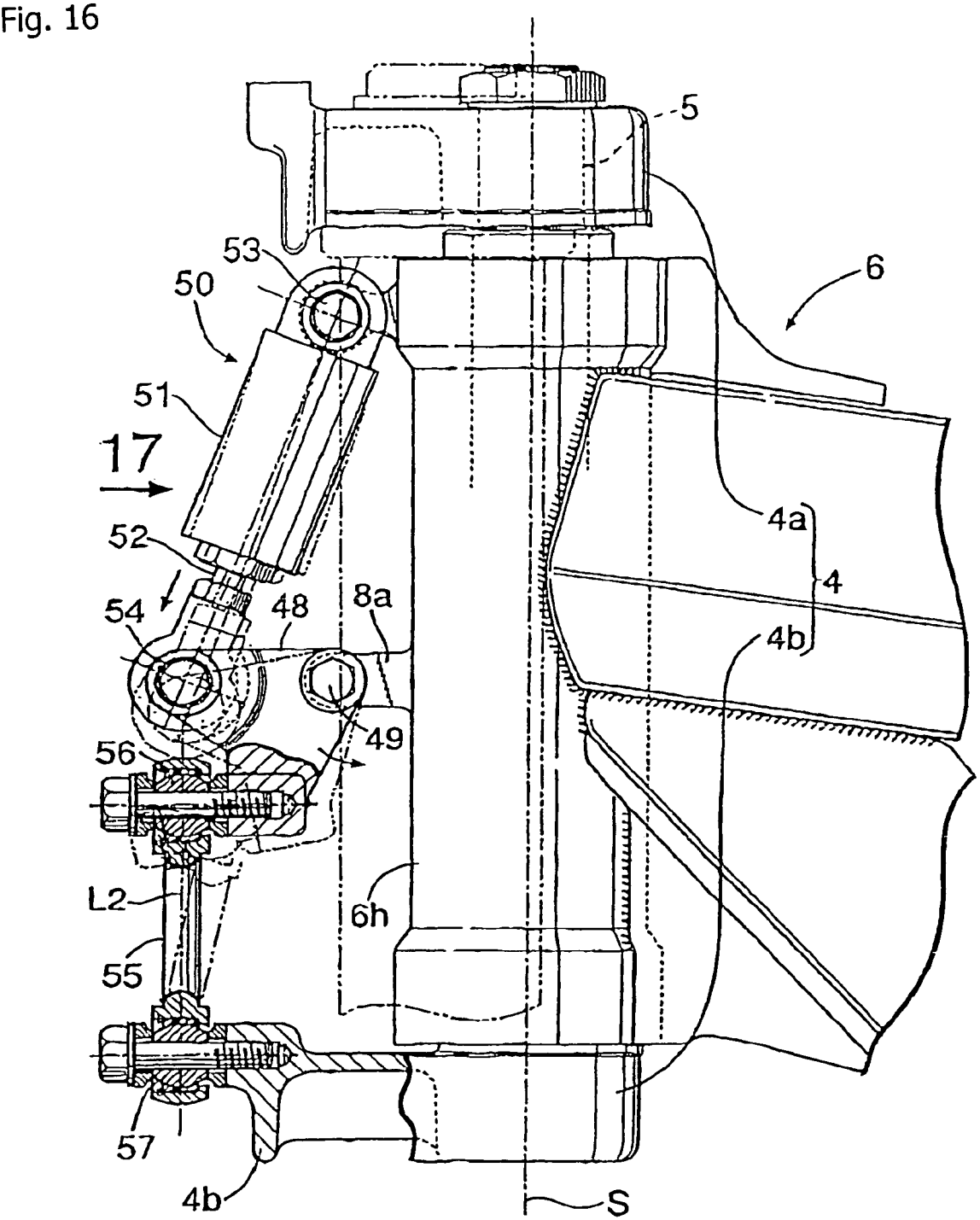
FIG. 16 is a side view of a fork bridge portion of the front fork of a motorcycle provided with a steering damper apparatus according to a fourth embodiment of the present invention.
Figure 17:
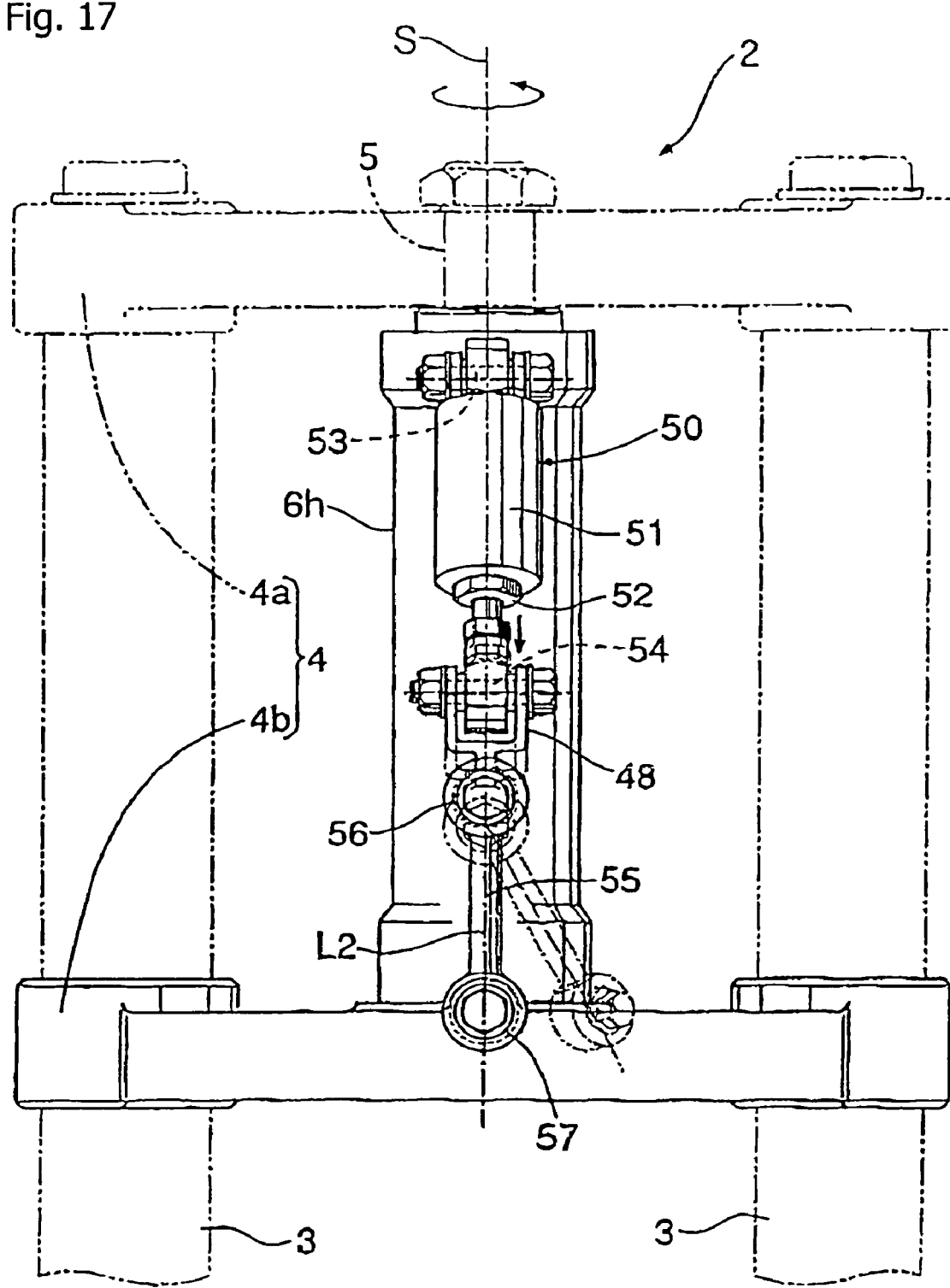
FIG. 17 is a front view viewed in the direction indicated by an arrow 17 in FIG. 16.

FIG. 16 and FIG. 17 show a fourth embodiment of the steering damper apparatus according to the present invention. FIG. 16 is a side view of a fork bridge portion of the front fork of a motorcycle provided with a steering damper apparatus according to a fourth embodiment of the present invention, and FIG. 17 is a front view viewed in the direction indicated by an arrow 17 in FIG. 16.

In the fourth embodiment, the parts corresponding to the first embodiment are represented by the same reference numerals and duplicated description is omitted.

As shown in FIG. 16 and FIG. 17, in the case of the fourth embodiment, a substantially triangular link lever 48 is pivotally supported at the front end of a forwardly projecting stay 8a from the vertical center of the head pipe 6h via a horizontal shaft 49. Then, a cylindrical damper 50 is disposed between the link lever 48 and the upper end of the head pipe 6h.

The cylindrical damper 50 includes a damper case 51 and a damper rod 52 sliding in the damper case 51, the damper case 51 is pivotally connected to the front surface of the upper end of the head pipe 6h via a horizontal shaft 53, and the damper rod 52 is pivotally connected to the front end of the link lever 48 via a horizontal shaft 54. On the other hand, a rink rod 55 is pivotally connected to the front surface of the lower end of the link lever 48 via a spherical joint 56 and the other end of the link rod 55 is pivotally connected to the front surface of the lateral center of the bottom bridge 4b which corresponds to the lower portion of the fork bridge 4, via a spherical joint 57.

In this manner, the cylindrical damper 50 is connected to the vehicle body frame 6 which does not rotate when the handlebar is operated, and is connected to the fork bridge 4 which corresponds to the steering-side member rotating about the steering stem 5 when the handlebar is operated via the link lever 48 and the link rod 55. The link rod 55 is disposed in such a manner that a straight line L2 connecting the centers of the spherical joints 56, 57 which are the joint portions at both ends of the link rod 55 is positioned on the center plane of the vehicle body including the center axis S of the steering stem 5 and extending in the fore-and-aft direction of the vehicle body when the handlebar 7 is at the neutral position, that is, when the steered angle of the handlebar is zero degrees.

The cylindrical damper 50 generates a damping force when being expanded, and generates little damping force when being contracted. The construction of other parts is also the same as the first embodiment.

In the steering damper apparatus thus configured, when the handlebar 7 is turned leftward for example, the front fork 2 rotates leftward about the center axis S of the steering stem 5, and the bottom bridge 4b rotates as well. Therefore, the spherical joint 57 connected to the center of the front portion of the bottom bridge 4b moves to the position indicated by an alternate long and two short dashes line in FIG. 17.

Consequently, the spherical joint 56 connected to the link lever 48 is pulled downward by the link rod 55 connected to the spherical joint 57, and the link lever 48 rotates about the horizontal axis 49 as indicated by an arrow in FIG. 16. Therefore, the cylindrical damper 50 is expanded, and a damping force is applied from the cylindrical damper 50 to the bottom bridge 4b, which corresponds to the steering-side member.

Also, when the handlebar 7 is turned rightward as well, the spherical joint 56 on the link lever 48 side is pulled downward, and hence the cylindrical damper 50 is expanded in the same manner and the damping force is generated. When the handlebar 7 which is turned rightward or leftward is returned to the neutral position, the cylindrical damper 50 is contracted in either cases and thus little damping force is generated.

In this manner, the steering damper apparatus according to the fourth embodiment can be adapted to generate the damping force when steered, and to generate little damping force when returning the steered steering. Also, with this steering damper apparatus, since the movement of the steering-side member is transmitted to the cylindrical damper 50 via the link rod 55 and the link lever 48, the cylindrical damper 50 can be disposed at a distance from the steering-side member and, in addition, in the given direction. Therefore, flexibility of the layout of the cylindrical damper 50 can be further increased.

Fifth Embodiment

Figure 18:
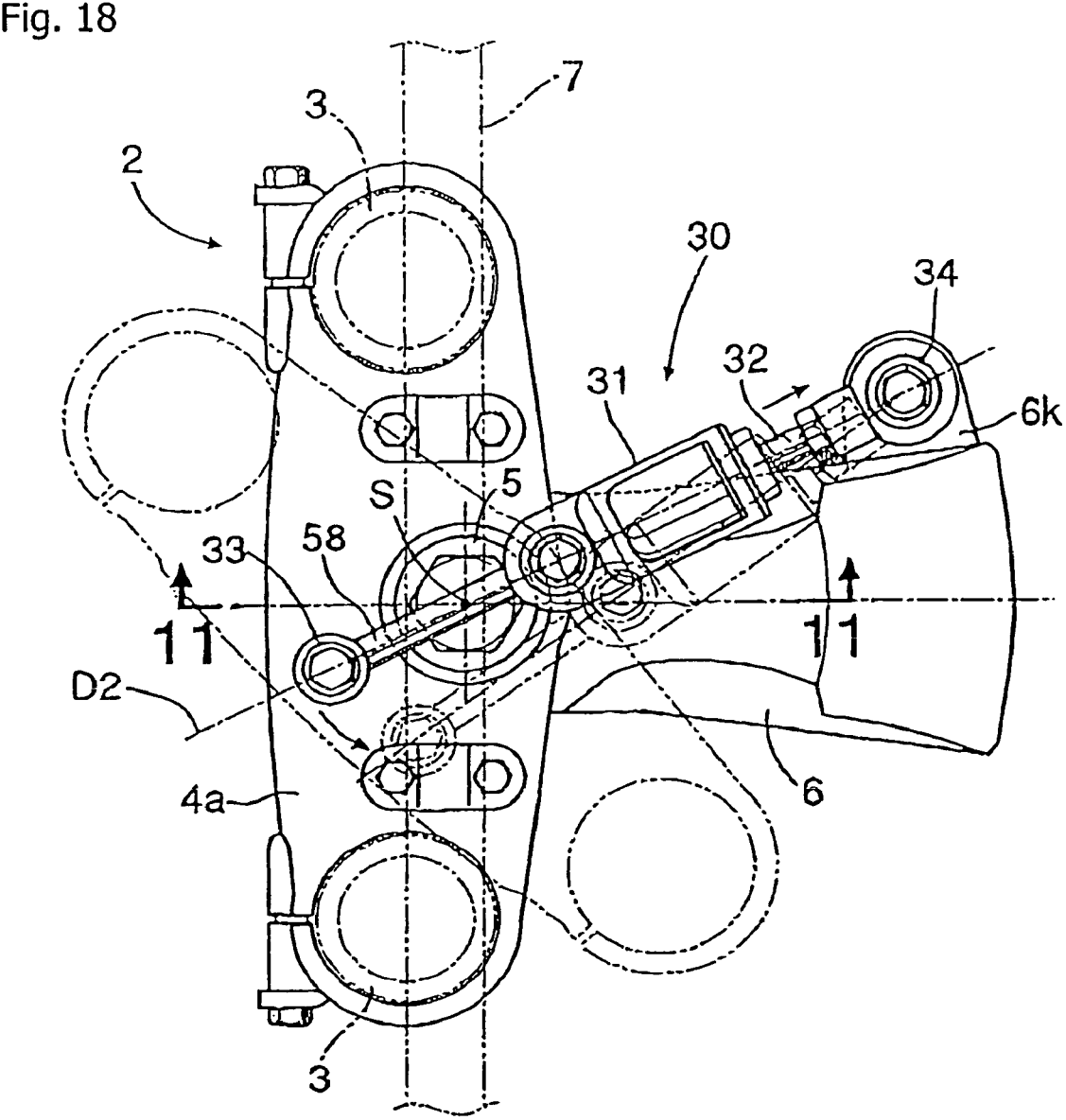
FIG. 18 is a plan view of the front fork portion of the motorcycle provided with the steering damper apparatus according to a fifth embodiment of the present invention.

FIG. 18 shows a fifth embodiment of the steering damper apparatus according to the present invention and is a plan view of the front fork portion of the motorcycle provided with the steering damper apparatus.

The fifth embodiment is a modification in which the position where the cylindrical damper 30 is arranged in the second embodiment described above is simply changed and most of the structure is the same as the second embodiment. Therefore, the parts corresponding to the second embodiment are represented by the same reference numerals, and duplicated description is omitted.

As shown in FIG. 18, in the case of the fifth embodiment, a stay (not shown) to which the spherical joint 33 is mounted at the upper end thereof is disposed at the position deviated from the lateral center toward the left on the upper surface of the top bridge 4a of the fork bridge 4, as the stay 28 in the second embodiment.

Then, the damper case 31 of the cylindrical damper 30 is pivotally connected and supported by the spherical joint 33 via the rod 58. On the other hand, the vehicle body frame 6 is provided with an extending portion 6k extending from the right side surface thereof toward the right, and the upper surface of the extending portion 6k is provided with a upwardly projecting stay (not shown) as the stay 29 in the second embodiment. Then, the damper rod 32 of the cylindrical damper 30 is pivotally connected to the stay via the spherical joint 34.

In this manner, in the case of the embodiment, the cylindrical damper 30 is disposed so that the center axis D2 of the cylindrical damper 30 forms an angle with respect to the center plane of the vehicle body when the steered angle of the handlebar is zero degrees. In this case as well, the center axis D2 of the cylindrical damper 30 intersects the center axis S of the steering stem 5. In other words, when the steered angle of the handlebar is zero degrees, the center axis D2 of the cylindrical damper 30 and the center axis S of the steering stem 5 are positioned on the identical plane.

In the steering damper apparatus in which the cylindrical damper 30 is disposed as described above as well, when the handlebar 7 is turned, for example, leftward from the state in which the steered angle of the handlebar is zero degrees, the top bridge 4a on the steering side rotates leftward about the center axis S of the steering stem 5 into the state shown by an alternate long and two short dashed line in FIG. 18, and hence the spherical joint 33 moves rearwardly of the vehicle body as shown by an arrow.

Therefore, the cylindrical damper 30 is contracted as well and a damping force is generated. Also, when returning the handlebar 7 steered to rightward, the damping force is generated since the cylindrical damper 30 is similarly expanded. Then, when returning the handlebar 7 steered to rightward or leftward to the neutral position, the cylindrical damper 30 is expanded in either cases so that little damping force is generated.

In this manner, in the case of the steering damper apparatus as described in the second embodiment, the cylindrical damper 30 is not necessarily required to be disposed on the center plane of the vehicle body in the fore-and-aft direction when the handlebar 7 is at the neutral position, and it is also possible to dispose it at the position deviated from the center plane of the vehicle body in the fore-and-aft direction to some extent.

In addition, the cylindrical damper 30 can be provided between the lower surface of the bottom bridge 4b of the fork bridge 4 and the vehicle body frame 6.

Sixth Embodiment

Figure 19:
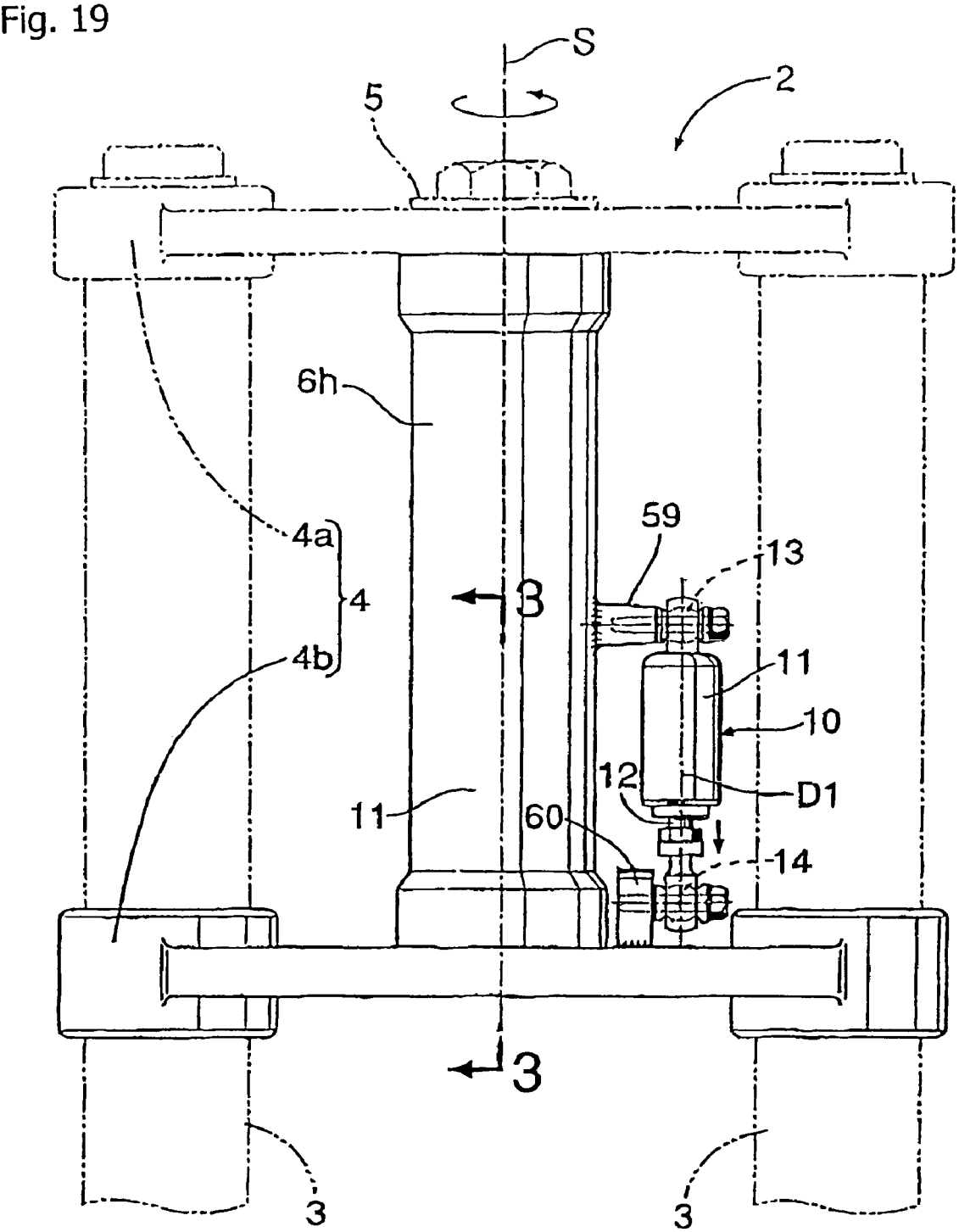
FIG. 19 is a plan view of a front fork portion of the motorcycle provided with the steering damper apparatus according to a sixth embodiment of the present invention.

FIG. 19 shows a sixth embodiment of the steering damper apparatus according to the present invention, and is a front view of a front fork portion of the motorcycle provided with the steering damper apparatus.

The sixth embodiment is a modification in which the position where the cylindrical damper 10 is arranged in the first embodiment described above is simply changed and most of the structure is the same as the first embodiment. Therefore, the parts corresponding to the first embodiment are represented by the same reference numerals, and duplicated description is omitted.

As shown in FIG. 19, in the case of the sixth embodiment, a leftwardly projecting stay 59 is provided on the left side surface of the head pipe 6h so as to project leftward. A upwardly projecting stay 60 is provided on the upper surface of the bottom bridge 4b at the position deviated leftward from the lateral center thereof.

Then, the damper case 11 of the cylindrical damper 10 is pivotally connected to the stay 59 on the side of the head pipe 6h via the spherical joint 13, and the damper rod 12 of the cylindrical damper 10 is pivotally connected to the stay 60 on the side of the bottom bridge 4b via the spherical joint 14. The cylindrical damper 10 is disposed in such a manner that the center axis D1 of the cylindrical damper 10 and the center axis S of the steering stem 5 are on the identical plane when the steered angle of the handlebar is in the vicinity of zero degrees by arranging the cylindrical damper 10 in such a manner that the center axis D1 thereof lies in parallel with the center axis S of the steering stem 5.

In the steering damper apparatus having the cylindrical damper 10 arranged as described above, the damper 10 is always expanded when the handlebar 7 is turned to either the left or the right from the steered angle of zero degrees. Then, when returning the handlebar 7 turned to the right or the left to the neutral position, the cylindrical damper 10 is contracted in either cases. Therefore, the apparatus can be adapted to generate the damping force when turning the handlebar 7, and generate little damping force when returning the handlebar 7.

In this manner, with the steering damper apparatus in which the cylindrical damper 10 is disposed at a distance from the center plane of the vehicle body, the same effect as the basic effect of the first embodiment can be obtained. In other words, the cylindrical damper 10 may be deviated from the center plane of the vehicle body extending in the-fore-and aft direction as long as the center axis D1 of the cylindrical damper 10 and the center axis S of the steering stem 5 are positioned on the same plane when the steered angle of the handlebar is in the vicinity of zero degrees.

In addition, the cylindrical damper 10 may be provided between the top bridge 4a of the fork bridge 4 and the vehicle body frame 6.

The cylindrical dampers 10, 30 may be those of a double-tube type having a reservoir chamber along the outer periphery of the damper chamber in addition to that having the reservoir chamber 17 on one side of the damper chamber 15 as in the above-described embodiments. Also, instead of compression gas 19 for urging the piston 18 provided on the reservoir chamber 17 side, a compression spring may be employed, or both of them may be employed.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention. In addition, the present invention may also be applied to other vehicles such as a four-wheel buggy, instead of the motorcycle as in the above-described embodiments.

We claim:

1. A steering damper apparatus for a vehicle, said apparatus comprising: a cylindrical damper having a damper case and a damper rod slidably disposed in the damper case, the cylindrical damper provided for installation on the vehicle between a steering-side member, which rotates about a steering stem when a handlebar is operated, and a vehicle-body-side member which does not rotate when the handlebar is operated,
    characterized in that the cylindrical damper is mounted in such a manner that the damper rod takes either a longest position or a shortest position when a steered angle of the handlebar is in the vicinity of zero degrees.

2. A steering damper apparatus according to claim 1, wherein the vehicle comprises a head pipe which pivotally supports the steering stem substantially along the length of the head pipe, characterized in that the cylindrical damper is provided in front of the head pipe, so that the damper rod takes the shortest position when the steered angle of the handlebar is in the vicinity of zero degrees.

3. A steering damper apparatus according to claim 1, characterized in that the cylindrical damper is provided in the fore-and-aft direction between a fork bridge positioned forwardly of the steering stem and a vehicle body frame positioned rearwardly of the steering stem so that the damper rod takes the longest position when the steered angle of the handlebar is in the vicinity of zero degrees.

4. The steering damper apparatus of claim 1, wherein the steering damper comprises a first spherical joint proximate a first end thereof, and a second spherical joint proximate a second end thereof.

5. A motorcycle, comprising a pivotally movable steering system part, a vehicle body frame, and the steering damper apparatus of claim 1 extending between the steering system part and a portion of the vehicle body frame.

6. A steering damper apparatus for a vehicle, comprising a cylindrical damper having a damper case and a damper rod slidably disposed in the damper case, the cylindrical damper disposed between a steering-side member, which rotates about a steering stem when a handlebar is operated, and a vehicle-body-side member, which does not rotate when the handlebar is operated,
    characterized in that the cylindrical damper is disposed so that a center axis of the cylindrical damper is positioned substantially on a plane including a center axis of the steering stem when the steered angle of the handlebar is in the vicinity of zero degrees.

7. A steering damper apparatus according to claim 6, characterized in that the cylindrical damper is disposed so that the center axis thereof lies substantially along a center plane of the vehicle body extending in the fore-and-aft direction of the vehicle body when the steered angle of the handlebar is in the vicinity of zero degrees.

8. The steering damper apparatus of claim 6, wherein the steering damper comprises a first spherical joint proximate a first end thereof, and a second spherical joint proximate a second end thereof.

9. A motorcycle, comprising a pivotally movable steering system part, a vehicle body frame, and the steering damper apparatus of claim 6 extending between the steering system part and a portion of the vehicle body frame.

10. A steering damper apparatus for a vehicle, comprising a cylindrical damper having a damper case and a damper rod slidably disposed in the damper case, the cylindrical damper being disposed between a steering side member, which rotates about a steering stem when the handlebar is operated, and a vehicle-body-side member, which does not rotate when the handlebar is operated, characterized in that the cylindrical damper is mounted so that the damper rod slides in the damper case in the same direction in either cases where the cylindrical damper is steered leftward or rightward from the position at which the steered angle of the handlebar is zero degrees.

11. A steering damper apparatus according to claim 10, wherein the vehicle comprises a head pipe which pivotally supports the steering stem substantially along the length of the head pipe, characterized in that the cylindrical damper is provided in front of the head pipe, so that the damper rod takes the shortest position when the steered angle of the handlebar is in the vicinity of zero degrees.

12. A steering damper apparatus according to claim 10, characterized in that the cylindrical damper is provided in the fore-and-aft direction between a fork bridge positioned forwardly of the steering stem and the vehicle body frame positioned rearwardly of the steering stem so that the damper rod takes the longest position when the steered angle of the handlebar is in the vicinity of zero degrees.

13. A steering damper apparatus according to claim 10, characterized in that the amount of sliding movement of the damper rod with respect to the steered angle of the handlebar is small when the steered angle of the handlebar is in the vicinity of zero degrees, and increases as the steered angle of the handlebar goes away from zero degrees.

14. A steering damper apparatus according to claim 10, characterized in that a damping force acting on the steering-side member from the cylindrical damper is small when the steered angle of the handlebar is in the vicinity of zero degrees, and increases as the steered angle of the handlebar goes away from zero degrees.

15. The steering damper apparatus of claim 10, wherein the steering damper comprises a first spherical joint proximate a first end thereof, and a second spherical joint proximate a second end thereof.

16. A motorcycle, comprising a pivotally movable steering system part, a vehicle body frame, and the steering damper apparatus of claim 6 extending between the steering system part and a portion of the vehicle body frame.

* * * * *